United States Patent
Nakamura et al.

(10) Patent No.: US 7,749,306 B2
(45) Date of Patent: Jul. 6, 2010

(54) METHOD OF RESTARTING FEED AIR PURIFIER

(75) Inventors: Morimitsu Nakamura, Kai (JP); Masato Kawai, Yokohama (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 784 days.

(21) Appl. No.: 10/594,665

(22) PCT Filed: Mar. 29, 2005

(86) PCT No.: PCT/JP2005/005922
§ 371 (c)(1), (2), (4) Date: Sep. 28, 2006

(87) PCT Pub. No.: WO2005/094970
PCT Pub. Date: Oct. 13, 2005

(65) Prior Publication Data
US 2007/0193446 A1    Aug. 23, 2007

(30) Foreign Application Priority Data
Mar. 31, 2004    (JP) .............................. 2004-101690
Mar. 31, 2004    (JP) .............................. 2004-101692
Mar. 31, 2004    (JP) .............................. 2004-102084

(51) Int. Cl.
    B01D 53/02    (2006.01)
(52) U.S. Cl. .......................................... 95/99; 95/106
(58) Field of Classification Search ............. 95/96, 95/97, 98, 99, 106, 139
    See application file for complete search history.

(56) References Cited

U.S. PATENT DOCUMENTS
5,855,650 A * 1/1999 Kalbassi et al. ............... 95/106

FOREIGN PATENT DOCUMENTS
JP    4-257688    9/1992
JP    10-225610    8/1998
JP    2002-168561    6/2002

OTHER PUBLICATIONS
International Search Report for PCT/JP2005/005922 mailed May 24, 2005.
Nippon Sanso Engineering Report No. 22. 13-18 (2003).

* cited by examiner

Primary Examiner—Robert A Hopkins
(74) Attorney, Agent, or Firm—Nixon & Vanderhye P.C.

(57) ABSTRACT

A method of restarting a TSA apparatus includes, in the case where the TSA apparatus was stopped when or after when a temperature of a purge gas which flows out from a first adsorption column (5a) during a regeneration process became a peak temperature, in the first adsorption column (5a), closing an entrance valve, an exit valve, and an atmosphere-releasing valve; in a second adsorption column (5b) during an adsorption process, closing an entrance valve and an exit valve and opening an atmosphere-releasing valve so as to release a gas in the opposite direction to feed air flow, followed by closing the atmosphere-releasing valve; pressurizing, just before a restart, the second adsorption column (5b) with feed air to a pressure necessary for the adsorption process; and performing, after the restart, the regeneration process and the adsorption process continuously from the time point of stopping the TSA apparatus.

9 Claims, 25 Drawing Sheets

FIG. 2
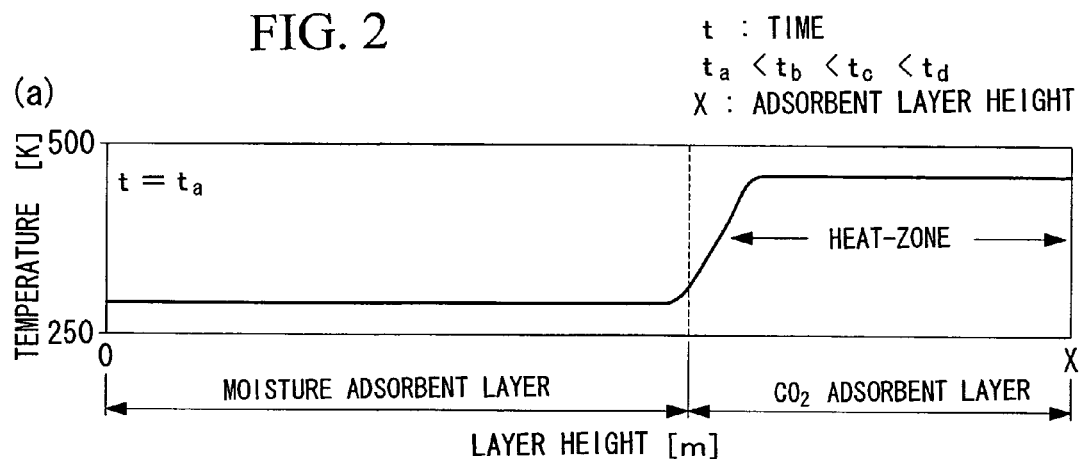
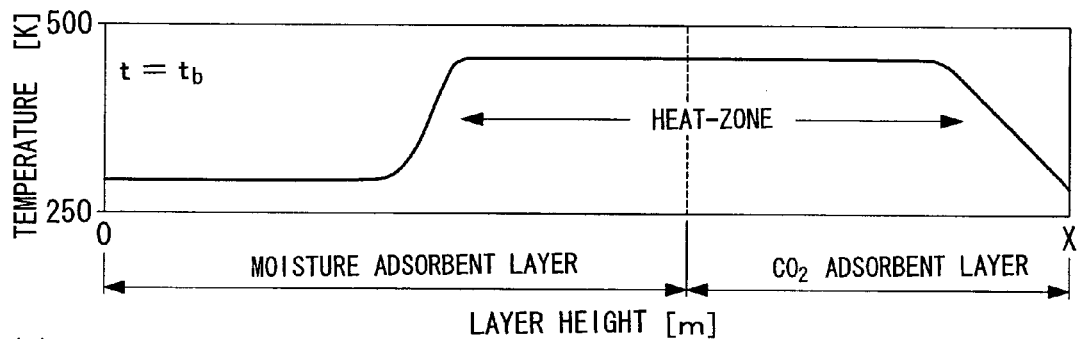
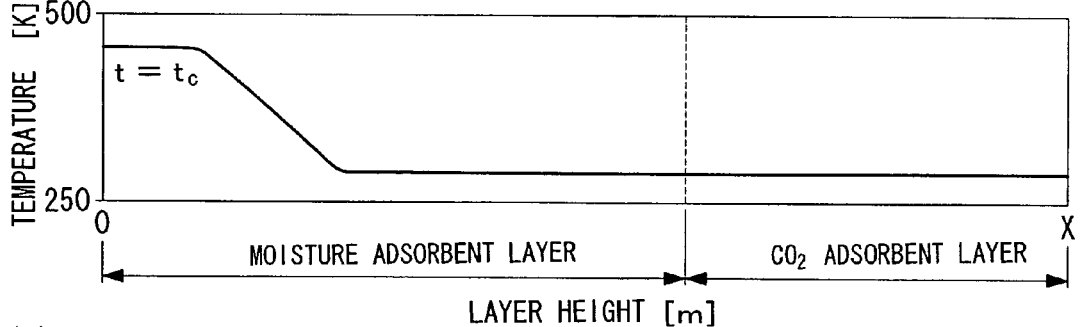
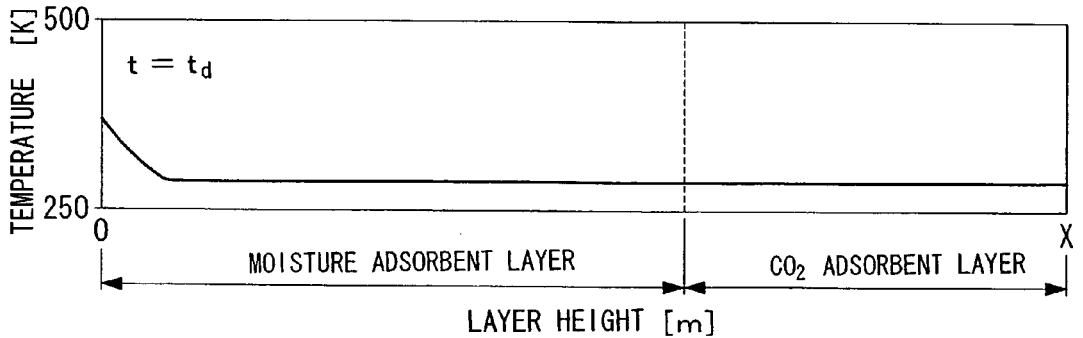

METHOD OF RESTARTING FEED AIR PURIFIER

This application is the US national phase of international application PCT/JP2005/005922 filed 29 Mar. 2005, which designated the U.S. and claimed priority of JP 2004-101690, 2004-101692 and 2004-102084 each filed 31 Mar. 2004, the entire contents of each of which are hereby incorporated by reference.

TECHNICAL FIELD

The present invention relates to a method of rapidly restarting a feed air purifier which removes impurities from feed air such as moisture and carbon dioxide in a cryogenic air separation plant.

Priorities are claimed on Japanese Patent Application No. 2004-101690, No. 2004-101692, and No. 2004-102084, each filed Mar. 31, 2004, the contents of which are incorporated herein by reference.

BACKGROUND ART

A cryogenic air separation plant is an apparatus in which feed air is liquefied and then separated by distillation into nitrogen, oxygen, and so on. When the distillation is performed, a process of removing impurities such as moisture and carbon dioxide which are frozen at low temperature so as to obstruct a pipe, so-called pretreatment, is performed in a feed air purifier. As this pretreatment, a temperature swing adsorption method (TSA method) is generally used, which uses two or more adsorption columns placed in parallel. A moisture adsorbent such as activated alumina, silica gel, or zeolite is filled upstream of the adsorption column to which feed air flows, and a carbon dioxide adsorbent such as an Na-X type zeolite is filled downstream. A temperature swing adsorption method alternately performs an adsorption process in which impurities such as moisture and carbon dioxide are removed by adsorption at low temperature and a regeneration process in which adsorbents are regenerated at high temperature.

Hereinafter, an example of operation during steady operation of a feed air purifier (hereinafter, referred to as TSA apparatus) by using a temperature swing adsorption method is explained with reference to FIG. 1. In this example, an adsorption column 5a is assumed to perform a regeneration process, and an adsorption column 5b is assumed to perform an adsorption process. FIG. 1 is a configurational illustration representing an example of a pretreatment part for feed air in a cryogenic air separation plant. First, feed air which is introduced from the atmosphere is compressed so as to reach a predetermined pressure (400 to 1,000 kPa (hereinafter, every pressure in the present specification represents an absolute pressure.)) by a feed air compressor 1, and then is cooled (at 5° C. to 45° C.) by a cooling apparatus 2. At this time, condensed water is ejected by a drain separator 3. Next, the condensed feed air with saturated moisture at a cooling temperature flows in the adsorption column 5b through a valve 4b, and the impurities such as the moisture and the carbon dioxide in the feed air are adsorbed by the adsorbent in the adsorption column 5b. Subsequently, purified feed air flows in an air separation section 8 through a line 7 and valves 6b, 18.

In the adsorption column 5b performing the adsorption process, a mass transfer zone of adsorbed components in the adsorbent layer proceeds from upstream of the adsorption column to which feed air flows to downstream. Therefore, the adsorption process is finished before the concentrations of the impurities in the purified air reach a limitation value, which is problematic in the air separation section 8.

After the end of the adsorption process, a regeneration process is started. The regeneration process includes four steps of a depressurizing step, a heating step, a cooling step, and a pressurizing step. In the depressurizing step, the valves 4b, 6b are closed, and the atmosphere-releasing valve 9b is opened. As a result, the gas held in the adsorption column 5b is ejected to the atmosphere through a silencer 10, and the pressure in the adsorption column 5b is decreased to atmospheric pressure.

In the following heating step, valves 12, 14b are opened. As a result, a part of the exhaust gas from the air separation section 8 flows in a heater 13 through a line 11 as a purge gas. After being heated to 150° C. to 250° C., the purge gas flows in the adsorption column 5b through the valve 14b. The inflow of the heated purge gas heats the adsorbent; therefore, the impurities such as moisture and carbon dioxide adsorbed to the adsorbent are desorbed from the adsorbent and flow out together with the purge gas flow. The purge gas flowing out is ejected to the atmosphere through an atmosphere-releasing valve 9b and the silencer 10.

FIG. 2 is a schematic graph representing an example of the temperature change of the purge gas in the adsorption column 5b performing the regeneration process as a function of the position. As shown in FIG. 2 (a), the zone with a high temperature (heat-zone) occurs in the adsorption column 5b due to the inflow of the heated purge gas. This heat-zone follows the purge gas flow to gradually migrate to the atmosphere-releasing valve 9b. After the end of the heating step, the cooling step is started. In the cooling step, the valve 12 is closed, and the valve 15 is opened. The purge gas does not flow in the heater 13 and directly flows in the adsorption column 5b at a low temperature. This purge gas cools the adsorbent. Also, as shown in FIGS. 2 (b), (c), and (d), the heat-zone is pushed by the low-temperature purge gas flow, migrates to the atmosphere-releasing valve 9b, and then is pushed out of the adsorption column 5b. The impurities are completely ejected from the adsorbent, and the temperature of the adsorbent becomes appropriate for the next adsorption process. Herein, the example represented by FIG. 2 is the same as in the case where the adsorption column 5a performs the regeneration process.

FIG. 3 is a graph representing an example of the temperature change of the purge gas in the adsorption column 5b performing the regeneration process during steady operation as a function of time. A moisture absorbent and a carbon dioxide absorbent are assumed to be deposited in a lower layer and an upper layer, respectively. When the heating step is started, the temperature at the top of a carbon dioxide adsorbent, which is represented by a solid line in FIG. 3, is steeply increased with the inflow of the heated purge gas from the upper part of the adsorption column 5b, and is steeply decreased when the cooling step is started.

The temperature at a border part of the moisture adsorbent and the carbon dioxide adsorbent located downstream of the purge gas flow, which is represented by a dashed line, starts to be smoothly increased after a while from when the heating step is started, keeps a certain temperature, and then starts to be smoothly decreased after a while from when the cooling step is started. The temperature at the outside of the bottom part of the moisture adsorbent (the purge gas-outflowing part) located further downstream (the atmosphere-releasing valve 9b side), which is represented by a bold solid line, starts to be smoothly increased and decreased after a while from when the cooling step is started. Herein, the example represented by FIG. 3 is the same as in the case where the adsorption column 5a performs the regeneration process.

In this way, the flow rate of the purge gas, the heating capacity of the heater, and the allocation of time for a heating step and a cooling step are decided so that the temperature of the moisture adsorbent is increased to a predetermined value during the cooling step and decreased to about the temperature at which feed air is fed before the adsorption process is started.

Subsequently, in a pressurizing step, the valves 14b, 15, and the atmosphere-releasing valve 9b are closed, and a valve 17b is opened. As a result, a part of purified air from the adsorption column 5a performing the adsorption process is returned to the adsorption column 5b through the line 7 and the line 16 and pressurizes the adsorption column 5b to the pressure necessary for the next adsorption process.

At the end of a pressurizing step, the valve 17b is closed, and the valves 4b, 6b are opened again. Then, the adsorption process is started again in the adsorption column 5b. For example, in the case of a two column system, the time for an adsorption process corresponds to the time for a regeneration process from a depressurizing step to the end of a pressurizing step, and the time necessary for each process is 2 to 4 hours. In this case, the adsorption columns 5a, 5b are exchanged alternatively so as to continuously feed purified feed air to the air separation section 8.

Since the cryogenic air separation plant takes a long time to cool the inside of the air separation section 8 from ambient temperature to a cryogenic temperature, the continuous operation is usually performed without stopping frequently. However, a cryogenic air separation plant is urgently stopped for some reasons or stopped according to a plan for a security check, and a TSA apparatus is also urgently stopped for some reasons or stopped according to a plan.

When a TSA apparatus performing the steady operation is stopped and the stop period becomes long, the impurities such as moisture and carbon dioxide are diffused in the adsorption column 5b performing the adsorption process even though the adsorption column 5b is kept in a sealed state. Therefore, there is a case where the impurities pass when an adsorption process is performed from the time point of stopping the TSA apparatus after the restart of the TSA apparatus, and the concentration of the impurities of the purified air can be increased more than during the steady operation and can exceed the limit value.

Meanwhile, in the adsorption column 5a performing the regeneration process, the heat introduced for the regeneration of adsorbent can be released outside due to heat transfer when the TSA apparatus is stopped for a long time. Therefore, when the regeneration process is performed from the time point of stopping the TSA apparatus after the restart of the TSA apparatus, the regeneration of the adsorbent becomes insufficient due to lack of heating, and the concentrations of the impurities in the purified air can be increased more than during the steady operation in the adsorption process after alternation.

In order to solve the aforementioned problems, a self regeneration operation is conventionally performed before feeding a purified air to the air separation section 8 after the restart of the TSA apparatus. This self regeneration operation is the following operation: reducing the flow rate of the feed air, which flows from the feed air compressor 1 to the adsorption column 5b, to less than during the steady operation so as to make a state of a low load; letting the purified air, which flowed out from the adsorption column 5b, flow in the adsorption column 5a while closing the valve 18 between the TSA apparatus and the air separation section 8; and performing an adsorption process and a regeneration process once or more.

The changed states in the each adsorption column that occurred during the stop period are cleared by using the self regeneration operation, and then the steady operation is started, thereby preventing the concentrations of the impurities in purified air from increasing.

Also, a method other than the self regeneration operation in the case of not performing the urgent stop but the planned stop is disclosed in Japanese Unexamined Patent Application, First Publication No. 2002-168561. In paragraph 0029 of this publication, the following is described: "the adsorbent in an adsorbing column in a rest condition is regenerated by the nitrogen gas obtained in an air separation section S2, thereby preventing the purification efficiency of an adsorption purification apparatus 12 from decreasing", and a method of preventing the purification efficiency of thr TSA apparatus from decreasing is described.

However, it is not economical to use nitrogen gas which is a product. Also, the self regeneration operation takes at least 4 hours in the case of a two column-alternating system since the time necessary for an adsorption process or a regeneration process is 2 to 4 hours, and purified gas cannot be fed to a cryogenic air separation plant in this period. Therefore, there is a problem in that the restart of a cryogenic air separation plant is late.

[Patent reference 1]
Japanese Unexamined Patent Application, First Publication No. 2002-168561

DISCLOSURE OF INVENTION

In view of the aforementioned conventional technical problems, an object of the present invention is to provide a method of quickly restarting a TSA apparatus. In order to solve the problem, a first aspect of the present invention is a method of restarting a temperature swing adsorption (TSA) apparatus which purifies feed air for a cryogenic air separation plant, including:

in the case where the TSA apparatus was stopped when or after when a temperature of a purge gas which flows out from a first adsorption column during a regeneration process became a peak temperature in the regeneration process, in the first adsorption column during the regeneration process, closing, at the time of stopping the TSA apparatus, an entrance valve, an exit valve, and an atmosphere-releasing valve;

in a second adsorption column during an adsorption process, closing an entrance valve and an exit valve and opening an atmosphere-releasing valve so as to release a gas in the opposite direction to feed air flow, followed by closing the atmosphere-releasing valve;

pressurizing, just before a restart, the second adsorption column with the feed air to a pressure necessary for the adsorption process; and performing, after the restart, the regeneration process in the first adsorption column and the adsorption process in the second adsorption column continuously from the time point of stopping the TSA apparatus.

The temperature of a purge gas flowing out from the first adsorption column means the temperature at a purge gas-outflowing part.

As for the first and second adsorption columns, after performing the aforementioned operations when the TSA apparatus was stopped, the states are kept until a restart. Just before a restart, the entrance valve of the second adsorption column is opened so as to pressurize the second adsorption column with the feed air to a pressure necessary for the adsorption process as the preparation for a restart.

When the pressure in the second adsorption column reaches the predetermined pressure, the TSA apparatus is restarted, and it is started to feed purified air to the air separation section.

In the first adsorption column which performed the regeneration process when the TSA apparatus was stopped, the regeneration process is performed again from the time point of stopping the regeneration process. After performing the remaining regeneration process, the regeneration process is switched to the adsorption process; thereafter, the normal operation is performed.

Meanwhile, in the second adsorption column which performed the adsorption process when the TSA apparatus was stopped, the adsorption process is performed again from the time point of stopping the adsorption process. After performing the remaining adsorption process, the adsorption process is switched to the regeneration process; thereafter, the normal operation is performed.

In the first aspect of the present invention, it is preferable that the feed air which is fed to the TSA apparatus have a temperature of 5° C. to 45° C. and a pressure of 400 to 1,000 kPa.

A second aspect of the present invention is a method of restarting a temperature swing adsorption (TSA) apparatus which purifies feed air for a cryogenic air separation plant, including:

in the case where an elapsed time $t_1$ of a regeneration process at the time point of stopping the TSA apparatus satisfies the following formula in a first adsorption column during the regeneration process, $$t_1 < t_2 - (R_1/R_2) \times (t_2 - t_3)$$

$t_1$: the elapsed time of the regeneration process (min)
$t_2$: a time of the regeneration process (min)
$t_3$: a time of a pressurizing step (min)
$R_1$: a flow rate of a purge gas (Nm$^3$/hour)
$R_2$: a flow rate of the feed air (Nm$^3$/hour)

in the first adsorption column during the regeneration process, closing, at the time of stopping the TSA apparatus, an entrance valve, an exit valve, and an atmosphere-releasing valve;

in a second adsorption column during an adsorption process, closing an entrance valve and an exit valve and opening an atmosphere-releasing valve so as to release a gas in the opposite direction to feed air flow, followed by closing the atmosphere-releasing valve;

pressurizing, just before a restart, the second adsorption column with the feed air to a pressure necessary for the adsorption process;

performing, after the restart, the regeneration process in the first adsorption column and the adsorption process in the second adsorption column from the beginning of each process while blocking purified air flow from the TSA apparatus to an air separation section; and starting to feed purified air to the air separation section.

Herein, Nm$^3$ is the unit representing a gas volume under atmospheric pressure at 0° C.

As for the first and second adsorption columns, after performing the aforementioned operations when the TSA apparatus was stopped, the states are kept until a restart. Just before a restart, the entrance valve of the second adsorption column is opened so as to pressurize the second adsorption column with the feed air to a pressure necessary for the adsorption process as a preparation for a restart.

When the pressure in the second adsorption column reaches the predetermined pressure, the TSA apparatus is restarted.

After the restart, the regeneration process in the first adsorption column and the adsorption process in the second adsorption column are performed from the beginning of each process. Then, the processes in the adsorption columns are switched, and it is started to feed purified air to the air separation section; thereafter, the normal operation is performed.

In the second aspect of the present invention, it is preferable that the feed air which is fed to the TSA apparatus have a temperature of 5° C. to 45° C. and a pressure of 400 to 1,000 kPa and that the adsorption process be performed with the flow rate of the feed air corresponding to the flow rate of the purge gas necessary for the regeneration process of the adsorption column after the restart before starting to feed the purified air to the air separation section.

A third aspect of the present invention is a method of restarting a method of restarting a temperature swing adsorption (TSA) apparatus which purifies feed air for a cryogenic air separation plant, including:

in a first adsorption column during a regeneration process, closing, at the time of stopping the TSA apparatus, an entrance valve, an exit valve, and an atmosphere-releasing valve;

in a second adsorption column during an adsorption process, closing an entrance valve and an exit valve and opening an atmosphere-releasing valve so as to release a gas in the opposite direction to feed air flow, followed by closing the atmosphere-releasing valve;

pressurizing, just before a restart, the second adsorption column with the feed air to a pressure necessary for the adsorption process;

performing, after the restart, the regeneration process in the first adsorption column and the adsorption process in the second adsorption column from the time point of stopping the TSA apparatus and then switching the processes to perform the adsorption process in the first adsorption column and the regeneration process in the second adsorption column once while blocking purified air flow from the TSA apparatus to an air separation section; and starting to feed purified air to the air separation section.

As for the first and second adsorption columns, after performing the aforementioned operations when the TSA apparatus was stopped, the states are kept until a restart. Just before a restart, the entrance valve of the second adsorption column is opened so as to pressurize the second adsorption column with the feed air to a pressure necessary for the adsorption process as the preparation for a restart.

When the pressure in the second adsorption column reaches the predetermined pressure, the TSA apparatus is restarted.

After the restart, in the first adsorption column which performed the regeneration process when the TSA apparatus was stopped, the regeneration process is performed again from the time point of stopping the regeneration process. After performing the remaining regeneration process, the adsorption process is performed.

Meanwhile, in the second adsorption column which performed the adsorption process when the TSA apparatus was stopped, the adsorption process is performed again from the time point of stopping the adsorption process. After performing the remaining adsorption process, the regeneration process is performed.

Then, the processes in the adsorption columns are switched, and it is started to feed purified air to the air separation section; thereafter, the normal operation is performed.

In the third aspect of the present invention, it is preferable that the feed air which is fed to the TSA apparatus have a temperature of 5° C. to 45° C. and a pressure of 400 to 1,000 kPa and that the adsorption process be performed with the flow rate of the feed air corresponding to the flow rate of the purge gas necessary for the regeneration process of the adsorption column after the restart before starting to feed the purified air to the air separation section.

A fourth aspect of the present invention is a method of restarting a temperature swing adsorption (TSA) apparatus which purifies feed air for a cryogenic air separation plant, including:

distinguishing the time point of stopping the TSA apparatus in the following three cases i), ii), and iii):

i) a case in which the TSA apparatus was stopped when or after when a temperature of a purge gas which flows out from a first adsorption column during a regeneration process became a peak temperature in the regeneration process, ii) a case in which an elapsed time $t_1$ of the regeneration process at the time point of stopping the TSA apparatus satisfies the following formula in the first adsorption column during the regeneration process, and $$t_1 < t_2 - (R_1/R_2) \times (t_2 - t_3)$$

$t_1$: the elapsed time of the regeneration process (min)
$t_2$: a time of the regeneration process (min)
$t_3$: a time of a pressurizing step (min)
$R_1$: a flow rate of the purge gas ($Nm^3$/hour)
$R_2$: a flow rate of the feed air ($Nm^3$/hour)

iii) a case other than the cases i) and ii);

in the case i), in the first adsorption column during the regeneration process, closing, at the time of stopping the TSA apparatus, an entrance valve, an exit valve, and an atmosphere-releasing valve, in a second adsorption column during an adsorption process, closing an entrance valve and an exit valve and opening an atmosphere-releasing valve so as to release a gas in the opposite direction to feed air flow, followed by closing the atmosphere-releasing valve, pressurizing, just before a restart, the second adsorption column with the feed air to a pressure necessary for the adsorption process, and performing, after the restart, the regeneration process in the first adsorption column and the adsorption process in the second adsorption column continuously from the time point of stopping the TSA apparatus;

in the case ii), in the first adsorption column during the regeneration process, closing, at the time of stopping the TSA apparatus, the entrance valve, the exit valve, and the atmosphere-releasing valve, in the second adsorption column during the adsorption process, closing the entrance valve and the exit valve and opening the atmosphere-releasing valve so as to release the gas in the opposite direction to the feed air flow, followed by closing the atmosphere-releasing valve, pressurizing, just before the restart, the second adsorption column with the feed air to the pressure necessary for the adsorption process, performing, after the restart, the regeneration process in the first adsorption column and the adsorption process in the second adsorption column from the beginning of the each process while blocking purified air flow from the TSA apparatus to an air separation section, and starting to feed purified air to the air separation section; and in the case iii), in the first adsorption column during the regeneration process, closing, at the time of stopping the TSA apparatus, the entrance valve, the exit valve, and the atmosphere-releasing valve, in the second adsorption column during the adsorption process, closing the entrance valve and the exit valve and opening the atmosphere-releasing valve so as to release the gas in the opposite direction to the feed air flow, followed by closing the atmosphere-releasing valve, pressurizing, just before the restart, the second adsorption column with the feed air to the pressure necessary for the adsorption process, performing, after the restart, the regeneration process in the first adsorption column and the adsorption process in the second adsorption column from the time point of stopping the TSA apparatus and then switching the processes to perform the adsorption process in the first adsorption column and the regeneration process in the second adsorption column once while blocking the purified air flow from the TSA apparatus to the air separation section, and starting to feed the purified air to the air separation section.

In the fourth aspect of the present invention, it is preferable that in the cases ii) and iii), the adsorption process be performed with the flow rate of the feed air corresponding to the flow rate of the purge gas necessary for the regeneration process of the adsorption column after the restart before starting to feed the purified air to the air separation section.

According to the present invention, it is possible to provide highly purified air even after a long stop. Also, since the self regeneration operation is not necessary, it is possible to reduce the time after the restart before starting to feed the purified air to the cryogenic air separation plant.

BRIEF DESCRIPTION OF THE DRAWINGS

FIG. 2 is a graph representing the temperature distributions of the purge gas at the times of $t_a$, $t_b$, $t_c$, and $t_d$ in the adsorption column performing the regeneration process.

Figure 1:
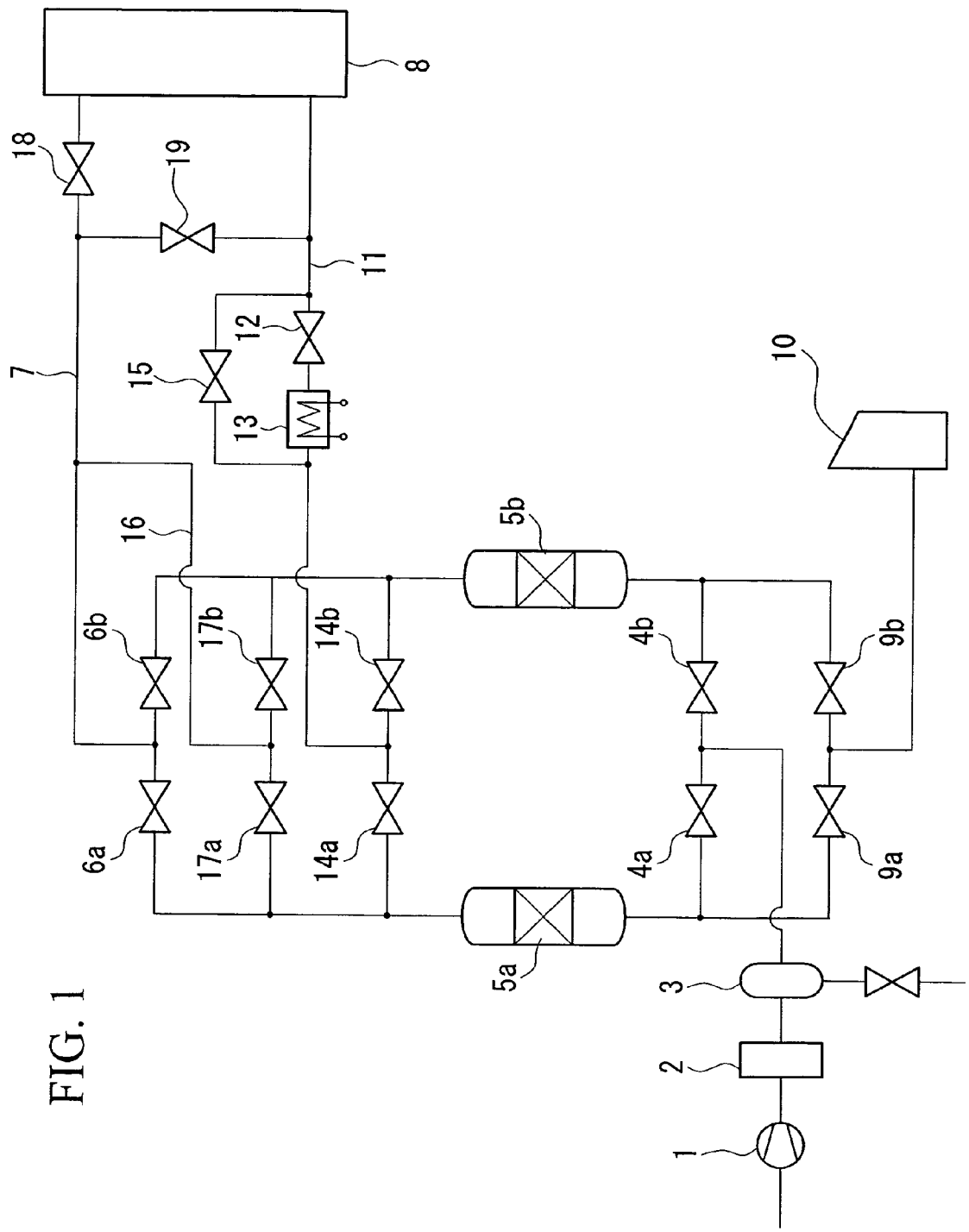
FIG. 1 is a configurational illustration representing an example of a cryogenic air separation plant in the present invention.

The reference numerals shown in these figures are defined as follows: 5a, 5b . . . adsorption column, 8 . . . air separation section, 9a, 9b . . . atmosphere-releasing valve

BEST MODE FOR CARRYING OUT THE INVENTION

Hereinafter, an embodiment of a method of restarting a TSA apparatus of a first aspect of the present invention is described with reference to the drawings. In this description, at the time of stopping the TSA apparatus, an adsorption column 5a is assumed to perform a regeneration process, and an adsorption column 5b is assumed to perform an adsorption process.

Figure 3:
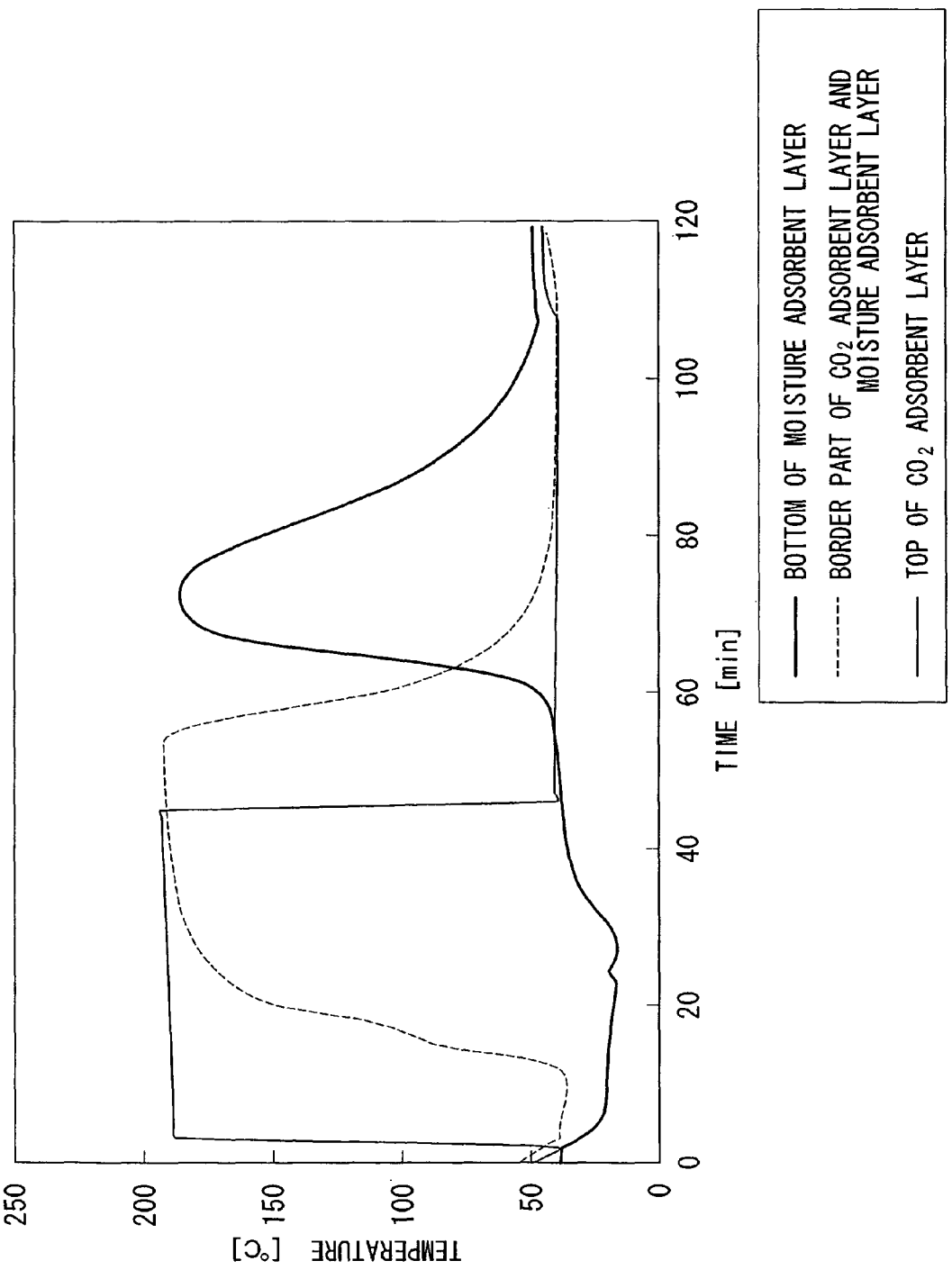
FIG. 3 is a graph representing the temperature change of the purge gas at a purge gas-outflowing part in the adsorption column performing the regeneration process as a function of time.

As shown in FIG. 3, the temperature of a purge gas at a purge gas-outflowing part of the adsorption column 5a reaches a peak temperature during a cooling step, and then it is cooled to the appropriate temperature for the next adsorption process. In the case where the TSA apparatus was stopped when or after when the temperature of the purge gas reaches the peak temperature, valves 14a, 15 and an atmosphere-releasing valve 9a are closed (valves 6a, 17a are closed during the regeneration process.).

In the adsorption column 5b which performed the adsorption process, after stopping the TSA apparatus, valves 4b, 6b at the entrance and the exit of the adsorption column 5b are closed, and the atmosphere-releasing valve 9b is opened (valves 7b, 14b are closed during the adsorption process.). The gas held in the adsorption column 5b flows out in the opposite direction to feed air flow. At this time, the impurities which are adsorbed to the adsorbent are desorbed with the outflowing gas. The outflow of the gas and the desorption of the impurities reduce the temperature in the adsorption column 5b. When the pressure in the adsorption column 5b is reduced to atmospheric pressure, the atmosphere-releasing valve 9b is closed. Also, after stopping the TSA apparatus, the heat in the adsorption column 5b is released outside due to heat transfer, so the temperature in the adsorption column 5b is gradually reduced. Since the adsorption column 5b which performed the adsorption process has been pressurized again by the inflow of the feed air after the restart of the TSA apparatus, the effect of the temperature reduction due to the outflow of the gas is cancelled, while the effect of the temperature reduction due to the desorption of the impurities and heat transfer remains. Therefore, in the adsorption column 5b, the adsorption process is started at a lower temperature than at the time point of stopping the TSA apparatus.

In general, the adsorption capacity of an adsorbent is increased with the temperature reduction. Therefore, just after the restart of the TSA apparatus, the adsorption capacity of the adsorbent in the adsorption column 5b is increased more than at the time point of stopping the TSA apparatus, and this increase has a sufficient effect of canceling the diffusion of the impurities during stopping the TSA apparatus.

After performing the aforementioned operations in the adsorption columns 5a, 5b, the TSA apparatus is kept after the stop. When the restart is performed, the air compressor 1 is started at first, and the valve 4b is opened. The adsorption column 5b is pressurized by the inflow of the feed air to the adsorption process pressure. After the pressurization, in the adsorption column 5b, the adsorption process is started from the time point of stopping the TSA apparatus. Also, valves 6b, 18 are opened, and purified air is fed to an air separation section 8 through a line 7.

Meanwhile, in the adsorption column 5a which performed the regeneration process, the regeneration process is started from the time point of stopping the TSA apparatus. When the valves 14a, 15, and the atmosphere-releasing valve 9a are opened, a part of the exhaust gas which flows out from the air separation section 8 flows in the adsorption column 5a through a line 11, and then it is released to atmosphere through a silencer 10.

The advisability of a method of restarting a TSA apparatus of the present invention is determined as follows. The temperature of the purge gas at the purge gas-outflowing part is measured or simulated so as to predict the time when the temperature of the purge gas reaches the peak temperature. Then, when the TSA apparatus is stopped, the elapsed time from the start of the regeneration process to the time of stopping the TSA apparatus is measured. When this elapsed time is the same as or longer than the time when the temperature of the purge gas reaches the peak temperature, a restart method of the present invention can be used.

Hereinafter, an embodiment of a method of restarting a TSA apparatus of a second aspect of the present invention is described with reference to the drawings. In this description, at the time of stopping the TSA apparatus, the adsorption column 5a is assumed to perform a regeneration process, and the adsorption column 5b is assumed to perform an adsorption process.

In the adsorption column 5b which performed the adsorption process, after stopping the TSA apparatus, the valves 4b, 6b at the entrance and the exit thereof are closed, and the atmosphere-releasing valve 9b is opened. The gas held in the adsorption column 5b flows out in the opposite direction to feed air flow. At this time, the impurities which are adsorbed to the adsorbent are desorbed with the outflowing gas. The outflow of the gas and the desorption of the impurities reduce the temperature in the adsorption column 5b. When the pressure in the adsorption column 5b is reduced to atmospheric pressure, the atmosphere-releasing valve 9b is closed. Also, after stopping the TSA apparatus, the heat in the adsorption column 5b is released outside due to heat transfer, so the temperature in the adsorption column 5b is gradually reduced. Since the adsorption column 5b which performed the adsorption process has been pressurized again by the inflow of the feed air after the restart of the TSA apparatus, the effect of the temperature reduction due to the outflow of the gas is cancelled, while the effect of the temperature reduction due to the desorption of the impurities and heat transfer remains. Therefore, in the adsorption column 5b, the adsorption process is started at a lower temperature than at the time point of stopping the TSA apparatus.

Meanwhile, in the adsorption column 5a, firstly, all valves (4a, 6a, 9a, 14a, and 17a) in the line connected to the adsorption column 5a are closed so as to seal the adsorption column 5a. Next, it is determined whether or not an elapsed time $t_1$ of the regeneration process at the time point of stopping the TSA apparatus satisfies the formula (1). The right-hand side of the formula (1) represents the elapsed time when the minimum adsorption capacity of the adsorbent in the adsorption column 5b can be assured even after stopping the TSA apparatus, which is needed to feed the purge gas in the case where the regeneration process in the adsorption column 5a is performed from the beginning by using, as the purge gas, the purified air which flows out from the adsorption column 5b performing the adsorption process. Therefore, in the case where the value of the elapsed time $t_1$ of the regeneration process is smaller than the value of the right-hand side of the formula (1), a restart method of the present invention can be used.

After performing the aforementioned operations in the adsorption columns 5a, 5b, the TSA apparatus is kept after the stop. When the restart is performed, the air compressor 1 is started at first, and the valve 4b is opened. The adsorption column 5b is pressurized by the inflow of the feed air to the adsorption process pressure. After the pressurization, the adsorption process in the adsorption column 5b is performed from the beginning by using the flow rate of feed air (low load) corresponding to the flow rate of the purge gas which is necessary for the regeneration process in the adsorption column 5a while blocking purified air flow from the TSA apparatus to the air separation section 8. In this case, the valves 6b, 19 are opened so as to let purified feed air flow in the adsorption column 5a through the lines 7, 11.

Since the adsorption process is performed from the beginning again, more than one adsorption process is performed without interleaving the regeneration process in the adsorption column 5b. Therefore, there is conventionally the possibility in that the impurities pass through the adsorption column 5b. However, since a restart method of the present invention is used in the case where the elapsed time $t_1$ of the regeneration process satisfies the formula (1), the adsorption capacity of the adsorbent in the adsorption column 5b, which is needed to perform the regeneration process in the adsorption column 5a from the beginning, can be assured even after stopping the TSA apparatus. In other words, it is possible to prevent the impurities from passing by the increase of the adsorption capacity due to the depressurizing operation just after stopping the TSA apparatus and by reducing the flow rate of feed air after the restart to a low load even though the adsorption process is performed more than one process.

Meanwhile, in the adsorption column 5a, the regeneration process is performed from the beginning. The atmosphere-releasing valve 9a is opened so as to release the gas in the adsorption column 5a to be depressurized to atmospheric pressure. Then, each step of heating, cooling, and pressurizing is performed. Herein, in the case where the depressurizing step was finished at the time point of stopping the TSA apparatus, the adsorption column 5a is in the depressurized state at the time of the restart, so the regeneration process is started from the heating step. In this case, the adsorption process time in the adsorption column 5b corresponds to the time of the regeneration process which is started from the heating step. In this way, when the regeneration process is performed from the beginning, all the adsorbents are regenerated by heating even though the deterioration of the regeneration was caused by the reduction in temperature due to the heat release.

After finishing the adsorption process and the regeneration process in the adsorption columns 5a, 5b, each process is switched, and the flow rate of the feed air is changed back to that during the steady operation. The valve 19 is closed, and the valve 18 is opened so as to start to feed the purified air to the air separation section 8 through the line 7.

In this method of restarting the TSA apparatus, there is no need to perform one or more of the adsorption process and the regeneration process, which are performed in the conventional self regeneration operation. Since the time from the restart to feeding the purified gas to the air separation section 8 is just only the time of one process, it is extremely economical.

Hereinafter, an embodiment of a method of restarting a TSA apparatus of a third aspect of the present invention is described with reference to the drawings. In this description, at the time of stopping the TSA apparatus, the adsorption column 5a is assumed to perform a regeneration process, and the adsorption column 5b is assumed to perform an adsorption process.

After stopping the TSA apparatus, in the adsorption column 5b which performed the adsorption process, the valves 4b, 6b at the entrance and the exit thereof are closed, and the atmosphere-releasing valve 9b is opened. The gas held in the adsorption column 5b flows out in the opposite direction to feed air flow. At this time, the impurities which are adsorbed to the adsorbent are desorbed with the outflowing gas. The outflow of the gas and the desorption of the impurities reduce the temperature in the adsorption column 5b. When the pressure in the adsorption column 5b is reduced to atmospheric pressure, the atmosphere-releasing valve 9b is closed. Also, after stopping the TSA apparatus, the heat in the adsorption column 5b is released outside due to heat transfer, so the temperature in the adsorption column 5b is gradually reduced. Since the adsorption column 5b has been pressurized again by the inflow of the feed air after the restart of the TSA apparatus, the effect of the temperature reduction due to the outflow of the gas is cancelled, while the effect of the temperature reduction due to the desorption of the impurities and heat transfer remains. Therefore, in the adsorption column 5b, the adsorption process is started at a lower temperature than at the time point of stopping the TSA apparatus.

Meanwhile, in the adsorption column 5a, all the valves (4a, 6a, 9a, 14a, and 17a) in the line connected to the adsorption column 5a are closed so as to seal the adsorption column 5a regardless of which step was performed in the regeneration process.

After performing the aforementioned operations in the adsorption columns 5a, 5b, the TSA apparatus is kept after the stop. When the restart is performed, the air compressor 1 is started at first, and the valve 4b is opened. The adsorption column 5b is pressurized by the inflow of the feed air to the adsorption process pressure. After the pressurization, the adsorption process in the adsorption column 5b is started from the time point of stopping the TSA apparatus by using the flow rate of feed air (low load) corresponding to the flow rate of the purge gas which is necessary for the regeneration process in the adsorption column 5a while blocking purified air flow from the TSA apparatus to the air separation section 8. In this case, the valves 6b, 19 are opened so as to let the purified feed air flow in the adsorption column 5a through the lines 7, 11.

Meanwhile, in the adsorption column 5a, the regeneration process is started from the time point of stopping the TSA apparatus. The restart operation in the adsorption column 5a is distinguished as the following four cases on the basis of the step of the regeneration process in which the TSA apparatus was stopped.

(1) Case in which the TSA Apparatus was Stopped in the Depressurizing Step

The atmosphere-releasing valve 9a is opened so as to release the gas in the adsorption column 5a to be depressurized to atmospheric pressure, thereby performing the remaining the depressurizing step. After the depressurizing step, it is transferred to the heating step, and the normal regeneration process is continuously performed.

(2) Case in which the TSA Apparatus was Stopped in the Heating Step

The valves 12, 14a are opened so as to heat the purified air from the adsorption column 5b to the predetermined temperature through the heater 13 and to let this purified gas flow in the adsorption column 5a as the heated purge gas, thereby performing the remaining heating step. At the same time, the atmosphere-releasing valve 9a is opened so as to release the heated purge gas flowing out from the adsorption column 5a through the silencer 10. After the heating step, it is transferred to the cooling step, and the normal regeneration process is continuously performed.

(3) Case in which the TSA Apparatus was Stopped in the Cooling Step

The valves 14a, 15 are opened so as to let the cooling gas flow in the adsorption column 5a, thereby performing the remaining cooling step. At the same time, the atmosphere-releasing valve 9a is opened so as to release the cooling gas flowing out from the adsorption column 5a through the silencer 10. After the cooling step, it is transferred to the pressurizing step, and the normal regeneration process is continuously performed.

(4) Case in which the TSA Apparatus was Stopped in the Pressurizing Step

The valve 17a is opened so as to let the purified air from the adsorption column 5b flow in the adsorption column 5a, thereby performing the remaining pressurizing step and finishing the regeneration process.

When the TSA apparatus is stopped for a long time during the heating step or in the early state of the cooling step, the heating regeneration of the adsorbent in the adsorption column 5a is interrupted, and the heat is released outside due to heat transfer while the adsorbent is not regenerated. Since the lack of heating occurs even though the regeneration process is continued after the restart, the heating regeneration of the adsorbent cannot be performed appropriately. Therefore, when the next adsorption process is performed in the adsorption column 5a by using the same flow rate of the feed air as in normal operation, there is the possibility that the impurities pass.

To deal with this case, the adsorption process in the state of the low load in the adsorption column 5a in which the aforementioned regeneration process is finished and the regeneration process in the adsorption column 5b in which the aforementioned adsorption process is finished are performed once more before feeding the purified air to the air separation section 8 after the restart. Since the amount of the purified air obtained in the next adsorption process in the adsorption column 5a is limited to the amount necessary for the regeneration process in the adsorption column 5b, the impurities do not pass through the adsorption column 5a even though the adsorbent in the adsorption column 5a is not regenerated. Therefore, the regeneration process is appropriately performed in the adsorption column 5b. Subsequently, in the adsorption columns 5a, the adsorption process is switched to the regeneration process, and then the flow rate of the feed air is changed back to that during the steady operation. The valve 19 is closed, and the valve 18 is opened so as to start to feed the purified air to the air separation section 8.

In this method of restarting the TSA apparatus, there is no need to perform the adsorption process and the regeneration process more than once in each adsorption column, which are performed in the conventional self regeneration operation, so the time from the restart to feeding the purified gas to the air separation section 8 can be reduced. In addition, since it is possible to restart the TSA apparatus regardless of which step was performed in the regeneration process, it is possible to use this method of restarting the TSA apparatus for both a planned stop and an urgent stop.

Hereinafter, an embodiment of a method of restarting a TSA apparatus of a fourth aspect of the present invention is described.

Firstly, the time point of stopping the TSA apparatus is distinguished in the following three cases i), ii), and iii):

i) the case in which the TSA apparatus was stopped when or after when a temperature of a purge gas which flows out from the first adsorption column during the regeneration process became the peak temperature in the regeneration process, ii) the case in which an elapsed time $t_1$ of the regeneration process at the time point of stopping the TSA apparatus satisfies the following formula (1) in the first adsorption column during the regeneration process, and $$t_1 < t_2 - (R_1/R_2) \times (t_2 - t_3) \quad (1)$$

$t_1$: the elapsed time of the regeneration process (min)
$t_2$: a time of the regeneration process (min)
$t_3$: a time of the pressurizing step (min)
$R_1$: a flow rate of the purge gas (Nm$^3$/hour)
$R_2$: a flow rate of the feed air (Nm$^3$/hour)
iii) the case other than the cases i) and ii).

Examples of the distinguishing method include the following.

The case i) is determined as follows.

The temperature of the purge gas at the purge gas-outflowing part is measured or simulated so as to predict the time when the temperature of the purge gas reaches the peak temperature. Then, the elapsed time from the start of the regeneration process to the time of stopping the TSA apparatus is measured. When this elapsed time is the same as or longer than the time when the temperature of the purge gas reaches the peak temperature, the case i) is determined.

The case ii) is determined by judging whether or not the elapsed time $t_1$ of the regeneration process at the time point of stopping the TSA apparatus satisfies the formula (1).

The case iii) is the case which is not determined as the cases i) and ii).

After distinguishing, a method of restarting a TSA apparatus of a first, second, or third aspect of the present invention is used in the case i), ii), or iii), respectively. In other words, in a method of restarting the TSA apparatus of a fourth aspect of the present invention can reduce the time from the restart to feeding the purified gas to the air separation section 8 regardless of the time point of stopping the TSA apparatus and can be used for both a planned stop and an urgent stop.

Herein, a measuring instrument may be provided on the adsorption columns 5a, 5b, which automatically distinguishes the cases i) to iii) (no illustration). Also, a control device, which controls each valve and the feed air compressor 1 so as to carry out a method of restarting a TSA apparatus of the present invention, may be connected to and capable of communicating with the measuring instrument (no illustration). When the measuring instrument and the control device are connected and capable of being communicated with each other, the distinguishing result of the measuring instrument is transferred to the control device, and the control device can operate in accordance with this distinguishing result. In other words, it is possible to automatically carry out a method of restarting a TSA apparatus of a fourth aspect of the present invention.

EXAMPLES

Hereinafter, the present invention is described in more detail in the following examples, while the present invention is not limited to these examples. In these examples, an adsorption column 5a is assumed to perform a regeneration process, and an adsorption column 5b is assumed to perform an adsorption process.

The advantageous effects of the present invention were confirmed by using the simulation.

In the stop period when there is neither outflow nor inflow of gas, the concentration distribution and the temperature distribution of the gas in the adsorption column is homogenized with the lapse of time. In order to imitate this situation, the axial gas dispersion and the axial heat transfer were considered in the calculation formulae of the material balance and the heat balance in the adsorption column in the simulation. The change of the concentration distribution of the gas during the stop was expressed as the diffusion in which the concentration distribution is the driving force and the convective flow based on the temperature distribution. The change of the concentration distribution of the gas during the stop was expressed as the heat transfer in which the temperature distribution is the driving force. Then, the carbon dioxide concentration at the outflowing part of the purified air in the adsorption column was calculated, which was obtained at the time point of finishing the adsorption process after the restart. Also, this result was compared with the carbon dioxide concentration at the outflowing part of the purified air in the adsorption column performing the adsorption process during the steady operation. The details of the simulation are disclosed in Nippon Sanso Engineering Report No. 22, 12-18 (2003).

Example 1

In Example 1, the simulation of the first aspect of the present invention was performed by using the cryogenic air separation plant represented by FIG. 1 as a model. The numeral conditions used in the simulation were as follows.

Moisture adsorbent: activated aluminum produced by PROCATALYSE (layer height: 0.88 m)
Carbon dioxide adsorbent: Na-X zeolite produced by W.R. Grace & Co. (layer height: 0.65 m)
Feed air pressure: 620 kPa (absolute pressure)
Feed air temperature: 40° C.
Purge gas ratio (flow rate of purge gas/flow rate of feed air): 40%
Heating gas temperature: 200° C.
Adsorption process time: 120 min
Regeneration process time: 120 min (depressurizing step: 3 min, heating step: 43 min, cooling step: 62 min, pressurizing step: 12 min)

Under the aforementioned numerical conditions, the temperature change in the adsorption column 5a performing the regeneration process during the steady operation was preliminary calculated. At the purge gas-outflowing part in the adsorption column, the temperature is increased in about 60 minutes from the start of the regeneration process, reaches the peak temperature in about 75 minutes, and then is smoothly decreased. Accordingly, all adsorbents are heated in about 75 min from the start of the regeneration process under the aforementioned numerical condition.

The simulation was performed with the assumption that the TSA apparatus was stopped in 90 min from the start of the regeneration process.

After stopping the TSA apparatus, the adsorption column 5a which performed the regeneration process was assumed to be kept in the state where all the valves were closed, and the adsorption column 5b which performed the adsorption process was assumed to be depressurized and then kept in the state where all the valves were closed. In this simulation, after a lapse of 72 hours, the adsorption column 5b was assumed to be pressurized with the feed air to 620 kPa just before the restart, followed by performing the adsorption process again from the time point of stopping the TSA apparatus. Meanwhile, in the adsorption column 5a, the regeneration process was assumed to be performed again from the time point of stopping the TSA apparatus after the restart.

Figure 4:
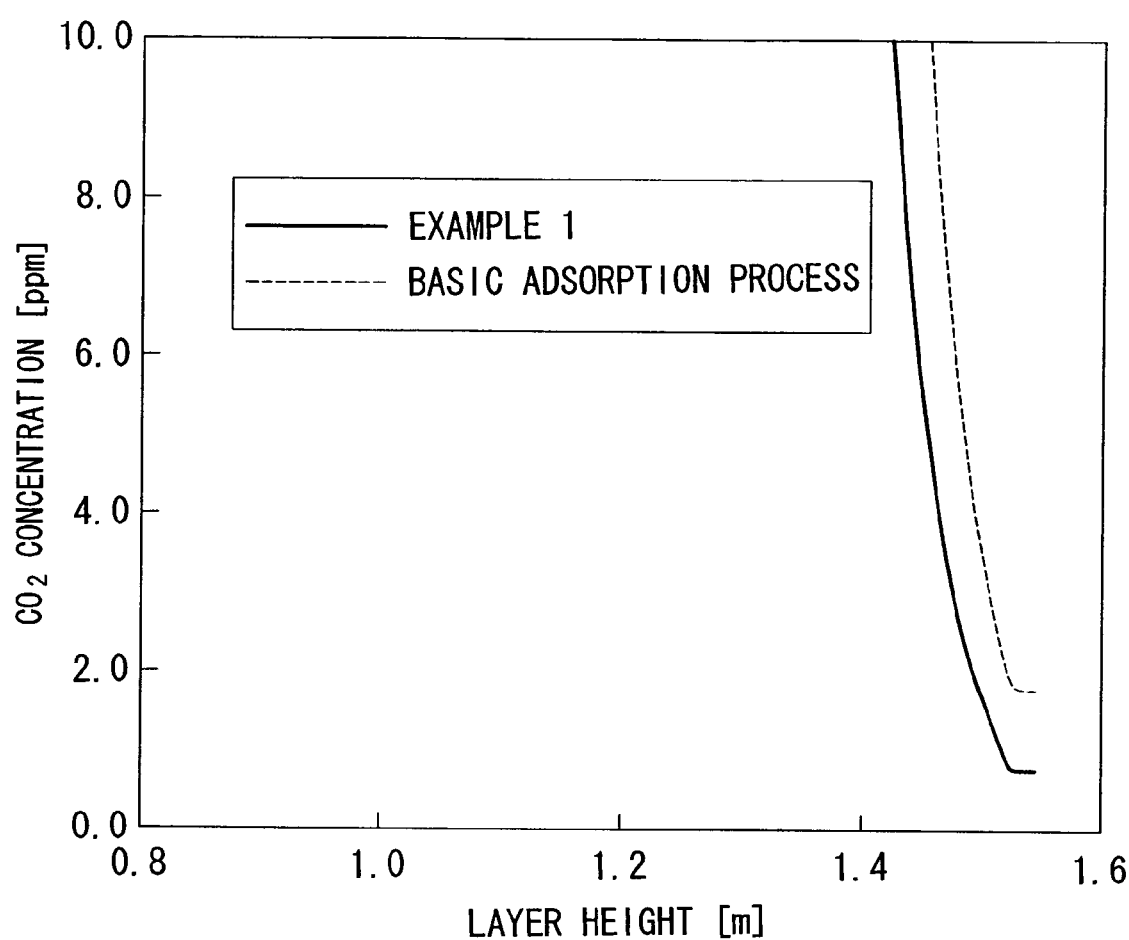
FIG. 4 is a graph representing, in Example 1, the distribution of the carbon dioxide concentration in the adsorption column 5b at the time point of finishing the adsorption process which was performed during the restart.

FIG. 4 is a graph representing the distribution of the carbon dioxide concentration in the adsorption column 5b at the time point of finishing the adsorption process which was performed again in accordance with the aforementioned conditions. Herein, the basic adsorption process means the distribution of the carbon dioxide concentration in the adsorption column 5b at the time point of finishing the adsorption process during the steady operation. At the outflowing part of the purified air in the adsorption column (layer height: 1.53 m), the carbon dioxide concentration in the basic adsorption process was about 1.7 ppm, and the carbon dioxide concentration in the adsorption column 5b with the aforementioned conditions was about 0.8 ppm. These results showed that the carbon dioxide concentration in the purified air flowing out from the adsorption column 5b after the restart was lower than during the steady operation.

Meanwhile, after the restart, the regeneration process was continuously performed in the adsorption column 5a. It was confirmed by the simulation that the carbon dioxide concentration in the adsorption column 5a at the time point of finishing the coming adsorption process was the same as the basic adsorption process.

Therefore, by using the restart method of the first aspect of the present invention, it is possible to restart the TSA apparatus without increasing the carbon dioxide concentration in the purified air from during the steady operation even though the TSA apparatus was stopped for a long time of 72 hours. It was confirmed by the simulation that the carbon dioxide concentration did not be increased from during the steady operation even when the TSA apparatus was stopped at any time point as long as the time point of stopping the TSA apparatus was in 75 min, in which the outflowing gas shows the peak temperature, or later.

Comparative Example 1

In Comparative example 1, the carbon dioxide concentration in the adsorption column 5a was calculated in the case where the TSA apparatus was stopped before the temperature of the purge gas at the purge gas-outflowing part in the adsorption column 5a reached the peak temperature and then was restarted in the first aspect of the present invention. The numerical conditions in this simulation were the same as in Example 1.

Under the numerical conditions of Example 1, the temperature of the purge gas at the purge gas-outflowing part in the adsorption column reaches the peak temperature in 75 min from the start of the regeneration process. In this simulation, the TSA apparatus was assumed to be stopped in 73 min from the start of the regeneration process. Then, in the same way as Example 1, the adsorption process was assumed to be performed again from the time point of stopping the TSA apparatus, followed by performing the regeneration process in the adsorption column 5b. Meanwhile, in the adsorption column 5a, the regeneration process was assumed to be performed again from the time point of stopping the TSA apparatus after the restart, followed by performing the adsorption process.

Figure 5:
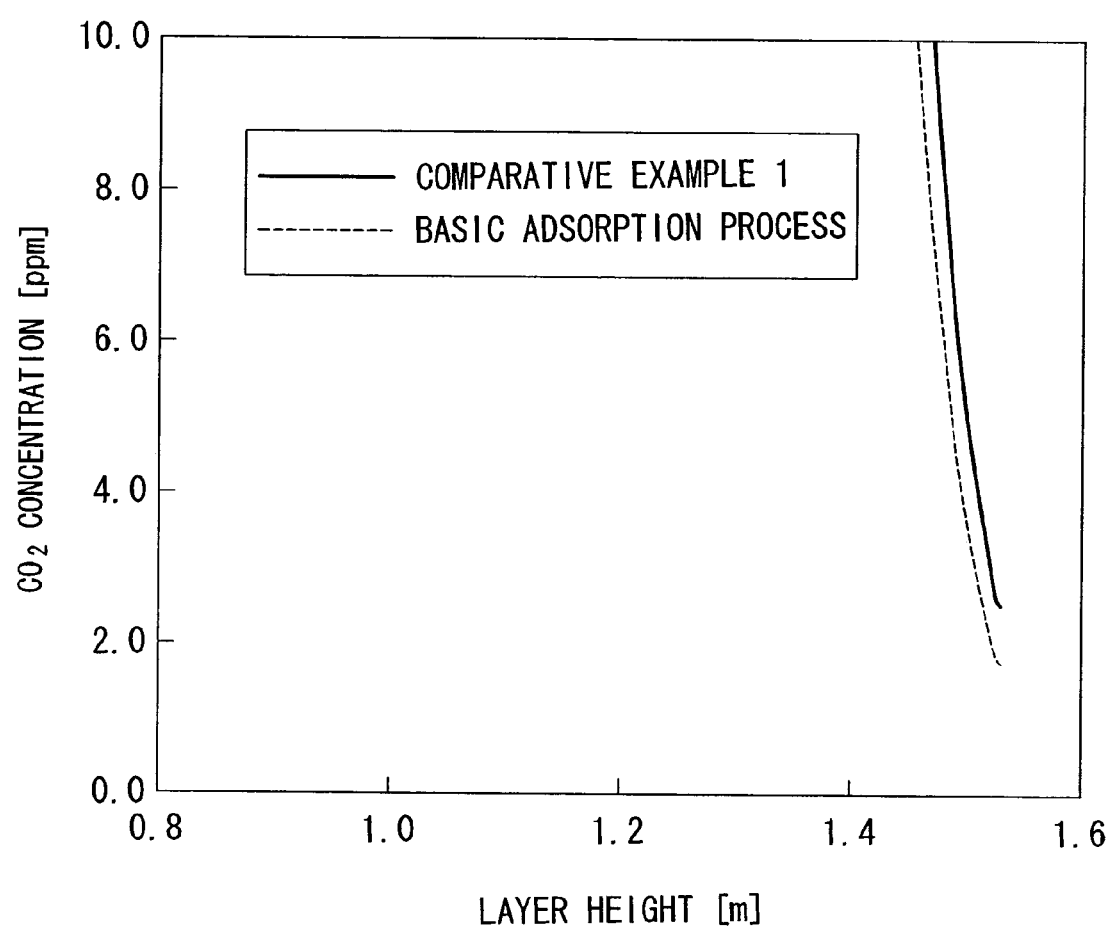
FIG. 5 is a graph representing, in Comparative example 1, the distribution of the carbon dioxide concentration in the adsorption column 5a at the time point of finishing the adsorption process which was performed during the restart.

FIG. 5 is a graph representing the distribution of the carbon dioxide concentration in the adsorption column 5a at the time point of finishing the adsorption process which was performed again in accordance with the aforementioned conditions. At the outflowing part of the purified air in the adsorption column (layer height: 1.53 m), the carbon dioxide concentration in the basic adsorption process was about 1.7 ppm, and the carbon dioxide concentration in the adsorption column 5a with the aforementioned conditions was about 2.5 ppm. These results showed that the carbon dioxide concentration in the purified air flowing out from the adsorption column 5a after the restart was higher than during the steady operation. When the TSA apparatus is operated beyond the restart method of a first aspect of the present invention, the carbon dioxide concentration in the purified air is increased from during the steady operation.

Meanwhile, it was confirmed by the simulation that the carbon dioxide concentration in the adsorption column 5b at the time point of finishing the adsorption process performed again after the restart was decreased in comparison with the basic adsorption process in the same way as the carbon dioxide concentration after the restart as represented by FIG. 4.

Comparative Example 2

In Comparative example 1, the carbon dioxide concentration in the purified air in the adsorption column 5b was calculated in the case where, after stopping the TSA apparatus, the TSA apparatus was kept without depressurizing the adsorption column 5b which had performed the adsorption process in the first aspect of the present invention. The numerical conditions in this simulation were the same as in Example 1.

In this simulation, the TSA apparatus was assumed to be stopped in 76 min from the start of the regeneration process. Then, the adsorption column 5a was assumed to be kept in the state where all valves were closed, and the adsorption column 5b was assumed to be not depressurized and to be kept in the state where all valves were closed. In this simulation, since the adsorption column 5b possessed the adsorption process pressure, after a lapse of 72 hours, the adsorption column 5b was assumed to be not pressurized, and the adsorption process was assumed to be performed again from the time point of stopping the TSA apparatus. Meanwhile, in the adsorption column 5a, the regeneration process was assumed to be performed again from the time point of stopping the TSA apparatus after the restart.

Figure 6:
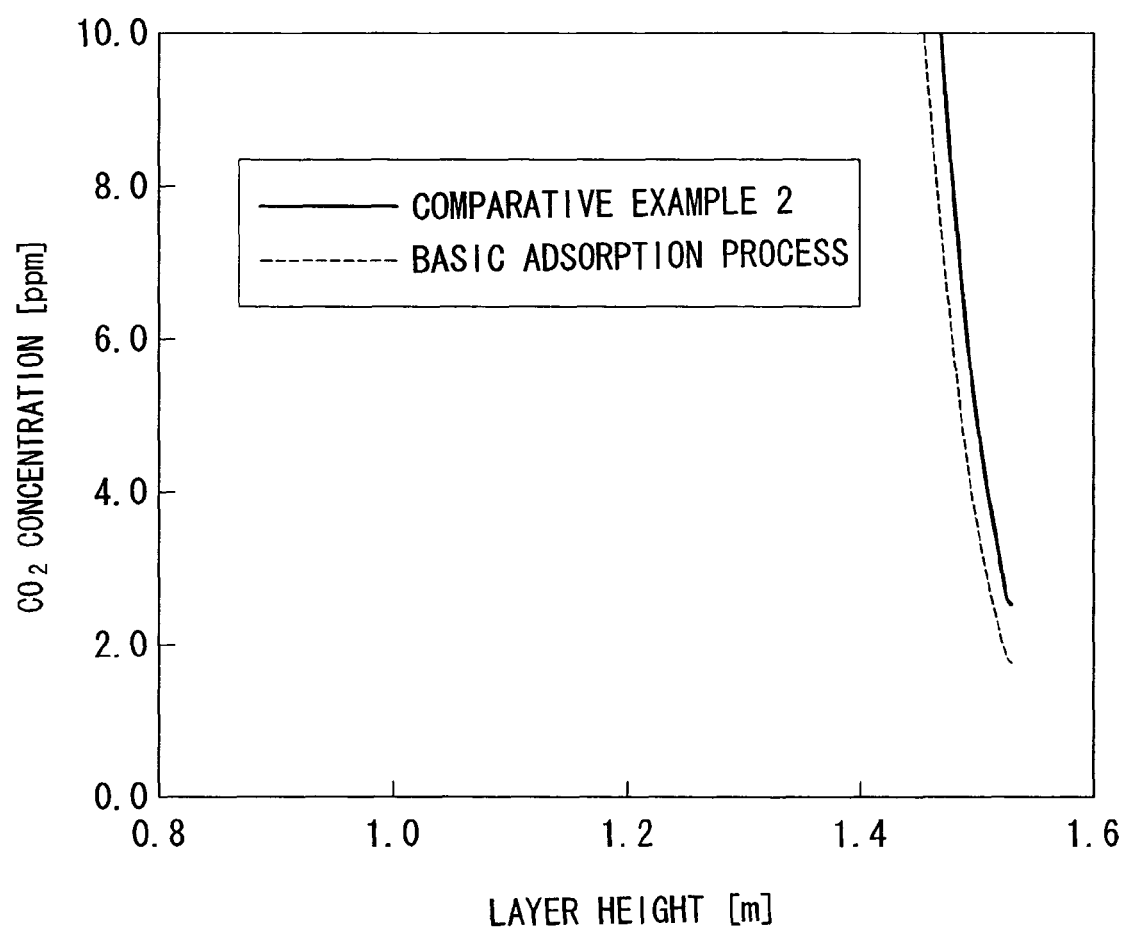
FIG. 6 is a graph representing, in Comparative example 2, the distribution of the carbon dioxide concentration in the adsorption column 5b at the time point of finishing the adsorption process which was performed during the restart.

FIG. 6 is a graph representing the distribution of the carbon dioxide concentration in the adsorption column 5b at the time point of finishing the adsorption process which was performed again in accordance with the aforementioned conditions. At the outflowing part of the purified air in the adsorption column (layer height: 1.53 m), the carbon dioxide concentration in the basic adsorption process was about 1.7 ppm, and the carbon dioxide concentration in the adsorption column 5b with the aforementioned conditions was about 2.4 ppm. These results showed that the carbon dioxide concentration in the purified air flowing out from the adsorption column 5b after the restart was higher than during the steady operation. When the TSA apparatus is operated beyond the restart method of the first aspect of the present invention, the carbon dioxide concentration in the purified air is increased from during the steady operation.

Example 2

In Example 2, the simulation of the first aspect of the present invention was performed while changing the several conditions in Example 1. The numeral conditions used in this simulation were as follows.

Moisture adsorbent: activated aluminum produced by PROCATALYSE (layer height: 0.28 m)
Carbon dioxide adsorbent: Na—X zeolite produced by W.R. Grace & Co. (layer height: 0.32 m)
Feed air pressure: 620 kPa (absolute pressure)
Feed air temperature: 10° C.

Purge gas ratio (flow rate of purge gas/flow rate of feed air): 15%
Heating gas temperature: 150° C.
Adsorption process time: 240 min
Regeneration process time: 240 min (depressurizing step: 6 min, heating step: 86 min, cooling step: 124 min, pressurizing step: 24 min)

Under the aforementioned conditions, the temperature at the purge gas-outflowing part in the adsorption column 5*a* performing the regeneration process during the steady operation was calculated, and the result showed that the temperature reached the peak temperature in 142 min from the start of the regeneration process. So, the TSA apparatus was assumed to be stopped in 145 min from the start of the regeneration process. Then, in the same way as Example 1, the adsorption process was assumed to be performed again from the time point of stopping the TSA apparatus in the adsorption column 5*b*. Meanwhile, in the adsorption column 5*a*, the regeneration process was assumed to be performed again from the time point of stopping the TSA apparatus after the restart.

Figure 7:
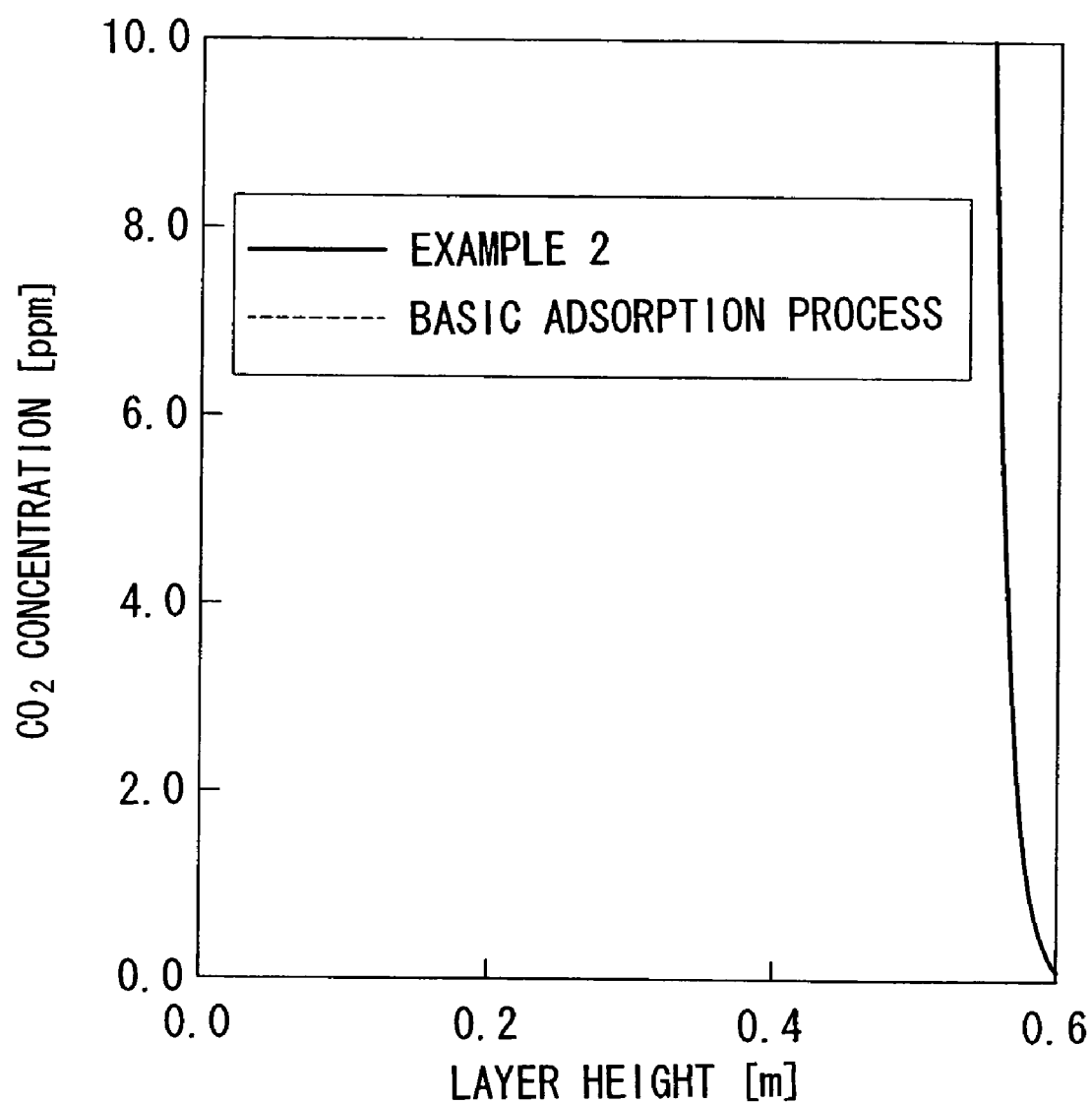
FIG. 7 is a graph representing, in Example 2, the distribution of the carbon dioxide concentration in the adsorption column 5b at the time point of finishing the adsorption process which was performed during the restart.

FIG. 7 is a graph representing the distribution of the carbon dioxide concentration in the adsorption column 5*b* at the time point of finishing the adsorption process which was performed again in accordance with the aforementioned conditions. At the outflowing part of the purified air in the adsorption column (layer height: 1.53 m), the carbon dioxide concentration in the basic adsorption process was about 0.2 ppm, and the carbon dioxide concentration in the adsorption column 5*b* with the aforementioned conditions was about 0.2 ppm. These results showed that the carbon dioxide concentrations of steady operation and restart operation were almost same.

Meanwhile, after the restart, the regeneration process was continuously performed in the adsorption column 5*a*, and it was confirmed by the simulation that the carbon dioxide concentration in the adsorption column 5*a* at the time point of finishing the coming adsorption process was the same as the basic adsorption process.

By using the restart method of the first aspect of the present invention, it is possible to restart the TSA apparatus without increasing the carbon dioxide concentration in the purified air from during the steady operation even though the TSA apparatus was stopped for a long time of 72 hours. Also, it was confirmed by the simulation that the carbon dioxide concentration did not be increased from during the steady operation even when the TSA apparatus was stopped at any time point as long as the time point of stopping the TSA apparatus was in 142 min, in which the outflowing gas shows the peak temperature, or later.

Example 3

In Example 3, the simulation of the second aspect of the present invention was performed by using the cryogenic air separation plant represented by FIG. 1 as a model. The numeral conditions used in this simulation were as follows.
Moisture adsorbent: activated aluminum produced by PROCATALYSE (layer height: 0.88 m)
Carbon dioxide adsorbent: Na-X zeolite produced by W.R. Grace & Co. (layer height: 0.65 m)
Feed air pressure: 620 kPa (absolute pressure)
Feed air temperature: 40° C.
Purge gas ratio (flow rate of purge gas/flow rate of feed air): 40%
Heating gas temperature: 200° C.
Adsorption process time: 120 min
Regeneration process time: 120 min (depressurizing step: 3 min, heating step: 43 min, cooling step: 62 min, pressurizing step: 12 min)

Under the aforementioned numerical conditions, the time range, in which the restart method of the second aspect of the present invention was applicable, was calculated by using the formula (1).

$$t_1 < 120 \text{ min} - 0.40 \times (120 \text{ min} - 12 \text{ min}) = 76.8 \text{ min}$$

From the result of the calculation, the restart method of the second aspect of the present invention was applicable when the elapsed time $t_1$ of the regeneration process was less than 76.8 min.

The TSA apparatus was assumed to be stopped in 70 min from the start of the regeneration process. After stopping the TSA apparatus, the adsorption column 5*a* which performed the regeneration process was assumed to be kept in the state where all the valves were closed, and the adsorption column 5*b* which performed the adsorption process was assumed to be depressurized and then kept in the state where all the valves were closed. In this simulation, after a lapse of 72 hours, the adsorption column 5*b* was assumed to be pressurized with the feed air to 620 kPa just before the restart, followed by performing the adsorption process from the beginning in the state of the low load. Meanwhile, in the adsorption column 5*a*, the regeneration process was assumed to be performed by using, as the purge gas, the purified air flowing out from the adsorption column 5*b* from the beginning after the restart.

Figure 8:
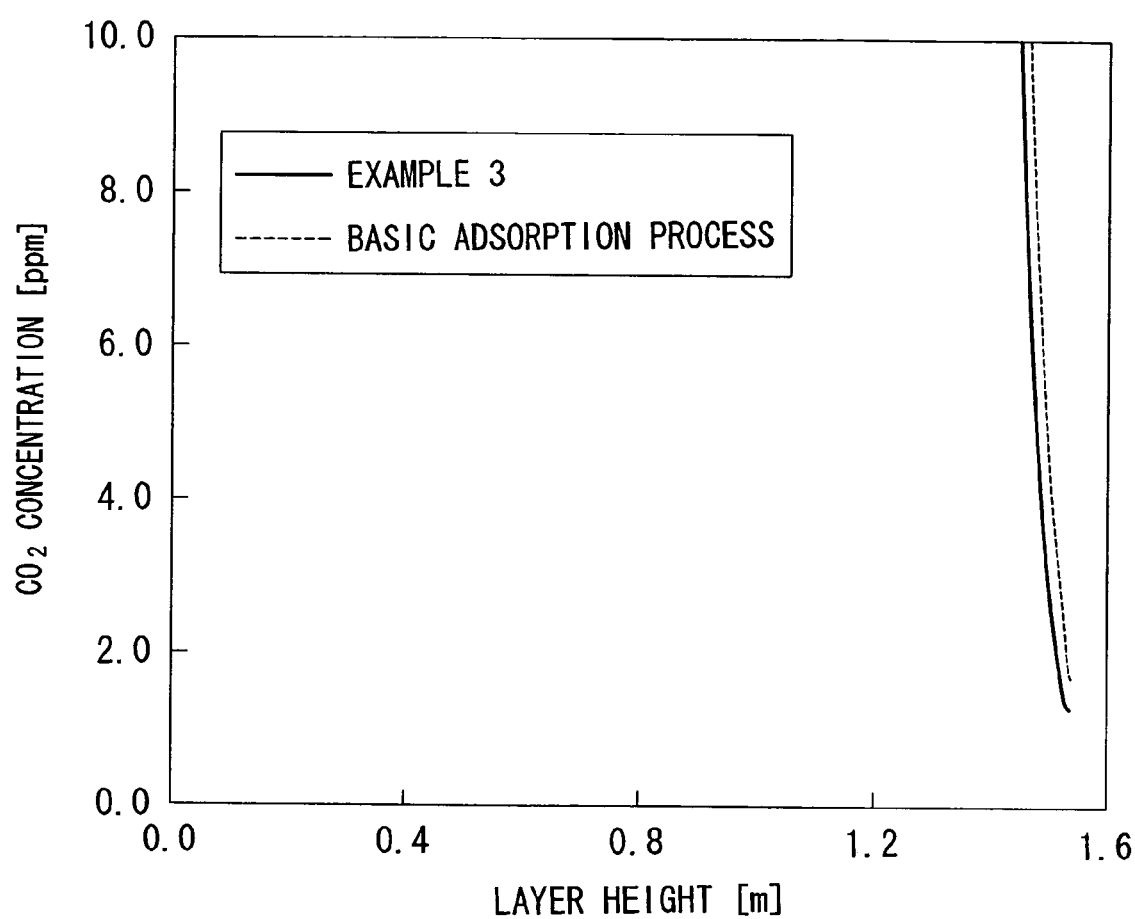
FIG. 8 is a graph representing, in Example 3, the distribution of the carbon dioxide concentration in the adsorption column 5b at the time point of finishing the adsorption process which was performed during the restart.

FIG. 8 is a graph representing the distribution of the carbon dioxide concentration in the adsorption column 5*b* at the time point of finishing the adsorption process which was performed in accordance with the aforementioned conditions. At the outflowing part of the purified air (layer height: 1.53 m), the carbon dioxide concentration in the basic adsorption process was about 1.7 ppm, and the carbon dioxide concentration in the adsorption column 5*b* with the aforementioned conditions was about 1.3 ppm. These results showed that the carbon dioxide concentration in the purified air flowing out from the adsorption column 5*b* after the restart was lower than during the steady operation. Also, these results showed that all the adsorbents in the adsorption column 5*a*, which performed the regeneration process by using the purified air as the purge gas, were appropriately regenerated by heating. Accordingly, after finishing each process, it is possible to start the steady operation and to start to feed the purified air to the air separation section 8.

From the above results, by using the restart method of the second aspect of the present invention, it is possible to restart the TSA apparatus without increasing the carbon dioxide concentration in the purified air from during the steady operation even though the TSA apparatus was stopped for a long time of 72 hours. Also, it was confirmed by the simulation that the carbon dioxide concentration did not be increased from during the steady operation even when the TSA apparatus was stopped at any time point as long as the time point of stopping the TSA apparatus was earlier than 76.8 min which was the calculation result of the formula (1).

Example 4

In Example 4, the simulation of the second aspect of the present invention was performed while changing each numerical condition used in Example 3. The numeral conditions used in this simulation were as follows.
Moisture adsorbent: activated aluminum produced by PROCATALYSE (layer height: 0.28 m)

Carbon dioxide adsorbent: Na-X zeolite produced by W.R. Grace & Co. (layer height: 0.32 m)
Feed air pressure: 620 kPa (absolute pressure)
Feed air temperature: 10° C.
Purge gas ratio (flow rate of purge gas/flow rate of feed air): 15%
Heating gas temperature: 150° C.
Adsorption process time: 240 min
Regeneration process time: 240 min (depressurizing step: 6 min, heating step: 86 min, cooling step: 124 min, pressurizing step: 24 min)

Under the aforementioned numerical conditions, the time range, in which the restart method of the second aspect of the present invention was applicable, was calculated by using the formula (1).

$$t_1 < 240 \text{ min} - 0.15 \times (240 \text{ min} - 24 \text{ min}) = 207.6 \text{ min}$$

From the result of the calculation, the restart method of the second aspect of the present invention was applicable when the elapsed time $t_1$ of the regeneration process was less than 207.6 min. The TSA apparatus was assumed to be stopped in 205 min from the start of the regeneration process. Then, in the same way as Example 3, the adsorption process was assumed to be performed from the beginning in the state of the low load in the adsorption column 5b. Meanwhile, in the adsorption column 5a, the regeneration process was assumed to be performed by using, as the purge gas, the purified air flowing out from the adsorption column 5b from the beginning after the restart.

Figure 9:
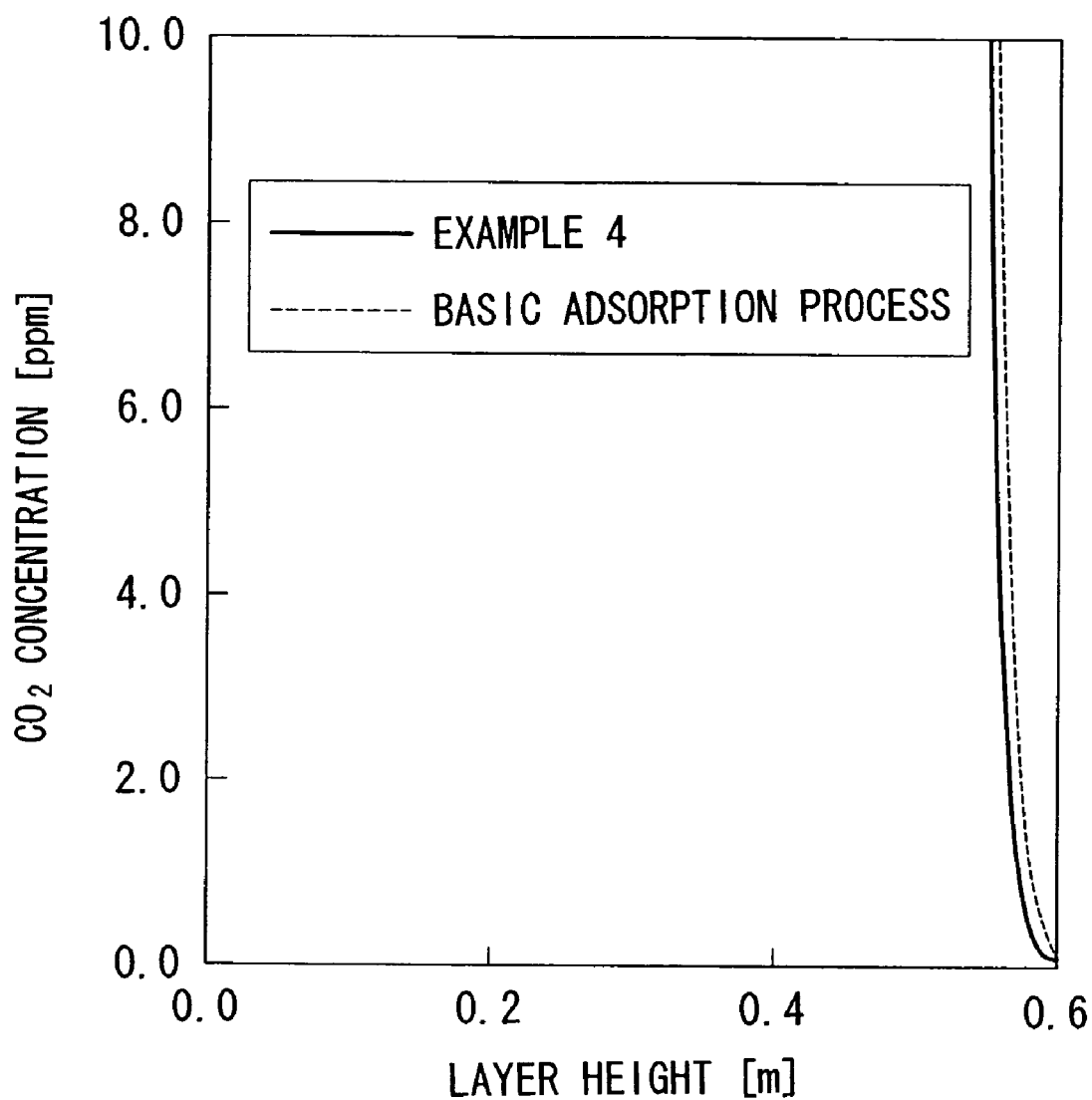
FIG. 9 is a graph representing, in Example 4, the distribution of the carbon dioxide concentration in the adsorption column 5b at the time point of finishing the adsorption process which was performed during the restart.

FIG. 9 is a graph representing the distribution of the carbon dioxide concentration in the adsorption column 5b at the time point of finishing the adsorption process with the aforementioned conditions. At the outflowing part of the purified air (layer height: 0.60 m), the carbon dioxide concentration in the basic adsorption process was about 0.3 ppm, and the carbon dioxide concentration in the adsorption column 5b with the aforementioned conditions was about 0.1 ppm. These results showed that the carbon dioxide concentration in the purified air flowing out from the adsorption column 5b after the restart was lower than during the steady operation. Also, these results showed that all the adsorbents in the adsorption column 5a, which performed the regeneration process by using the purified air as the purge gas, were appropriately regenerated by heating. Accordingly, after finishing each process, it is possible to start the steady operation and to start to feed the purified air to the air separation section 8.

From the above results, by using the restart method of the second aspect of the present invention, it is possible to restart the TSA apparatus without increasing the carbon dioxide concentration in the purified air from during the steady operation even though the TSA apparatus was stopped for a long time of 72 hours. Also, it was confirmed by the simulation that the carbon dioxide concentration did not be increased from during the steady operation even when the TSA apparatus was stopped at any time point as long as the time point of stopping the TSA apparatus was earlier than 207.6 min which was the calculation result of the formula (1).

Comparative Example 3

Under the numerical conditions of Example 3, it is before 76.8 min that the restart method of the second aspect of the present invention was applicable. In Comparative example 3, the carbon dioxide concentration in the adsorption column 5b was calculated in the case where the TSA apparatus was stopped in 76.8 min or later and then was restarted in the second aspect of the present invention. The numerical conditions in this simulation were the same as in Example 3.

In this simulation, the TSA apparatus was assumed to be stopped in 90 min from the start of the regeneration process. Then, in the same way as Example 3, the adsorption process was assumed to be performed from the beginning in the state of the low load in the adsorption column 5b. Meanwhile, in the adsorption column 5a after the restart, the regeneration process was assumed to be performed by using, as the purge gas, the purified air flowing out from the adsorption column 5b from the beginning.

Figure 10:
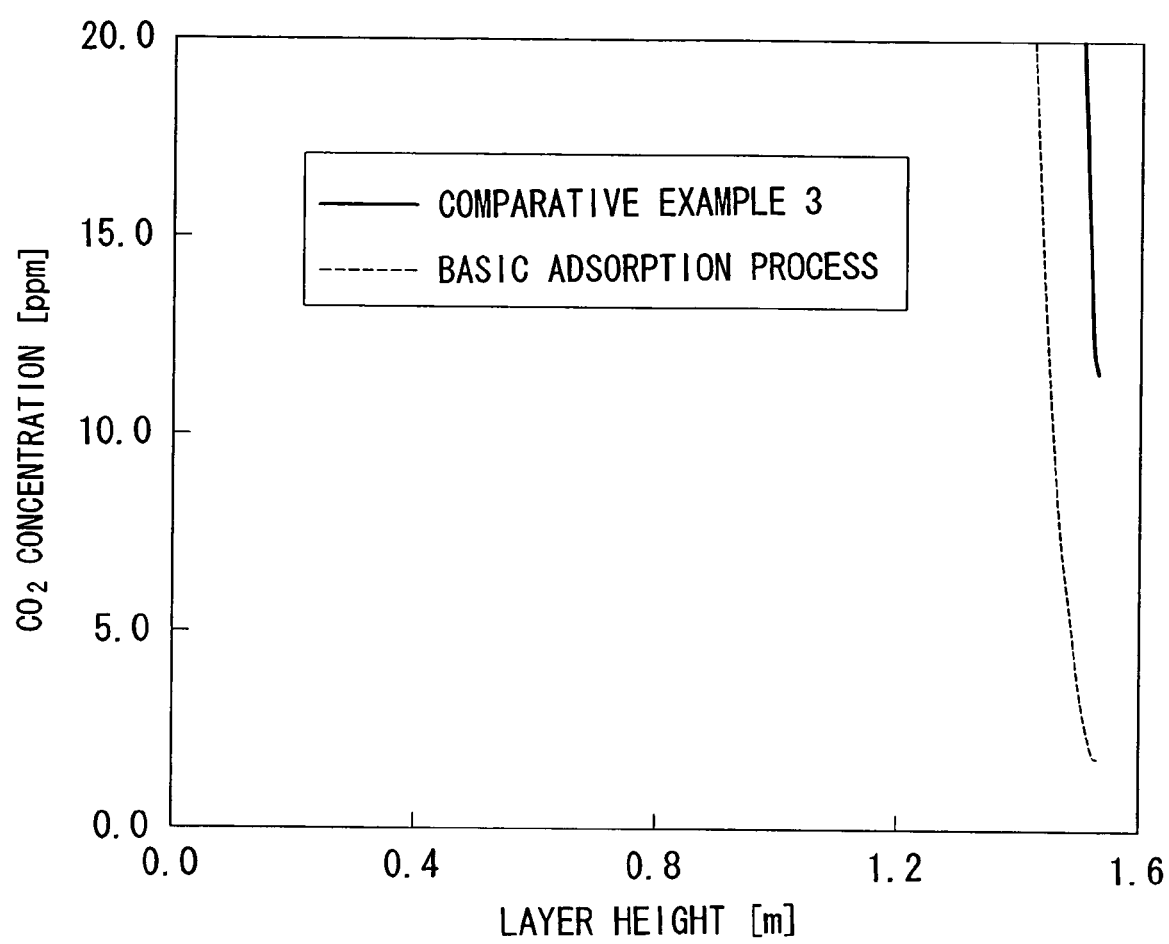
FIG. 10 is a graph representing, in Comparative example 3, the distribution of the carbon dioxide concentration in the adsorption column 5b at the time point of finishing the adsorption process which was performed during the restart.

FIG. 10 is a graph representing the distribution of the carbon dioxide concentration in the adsorption column 5b at the time point of finishing the adsorption process with the aforementioned conditions. At the outflowing part of the purified air (layer height: 1.53 m), the carbon dioxide concentration in the basic adsorption process was about 1.7 ppm, and the carbon dioxide concentration in the adsorption column 5b with the aforementioned conditions was about 11.5 ppm. These results showed that the carbon dioxide concentration in the purified air flowing out from the adsorption column 5b after the restart was higher than during the steady operation. Also, these results showed that the impurities flowed in the adsorption column 5a performing the regeneration process by using the purified air as the purge gas. Accordingly, when the elapsed time $t_1$ of the regeneration process is beyond the time range obtained by the formula (1), the self regeneration operation should be further performed several times.

Comparative Example 4

In Comparative example 4, the carbon dioxide concentration in the adsorption column 5b was calculated in the case where the adsorption and regeneration processes was performed again not from the beginning but from the time point of stopping the TSA apparatus. The numerical conditions in this simulation were the same as in Example 3.

In this simulation, the TSA apparatus was assumed to be stopped in 64 min from the start of the regeneration process. Then, in the same way as Example 1, the adsorption process was assumed to be performed again from the time point of stopping the TSA apparatus in the state of the low load in the adsorption column 5b. At this time, it was confirmed by the simulation that the impurities did not pass through the adsorption column 5b. Meanwhile, in the adsorption column 5a after the restart, the regeneration process was assumed to be performed again by using, as the purge gas, the purified air flowing out from the adsorption column 5b. After finishing the each process, the steady operation was assumed to be started.

Figure 11:
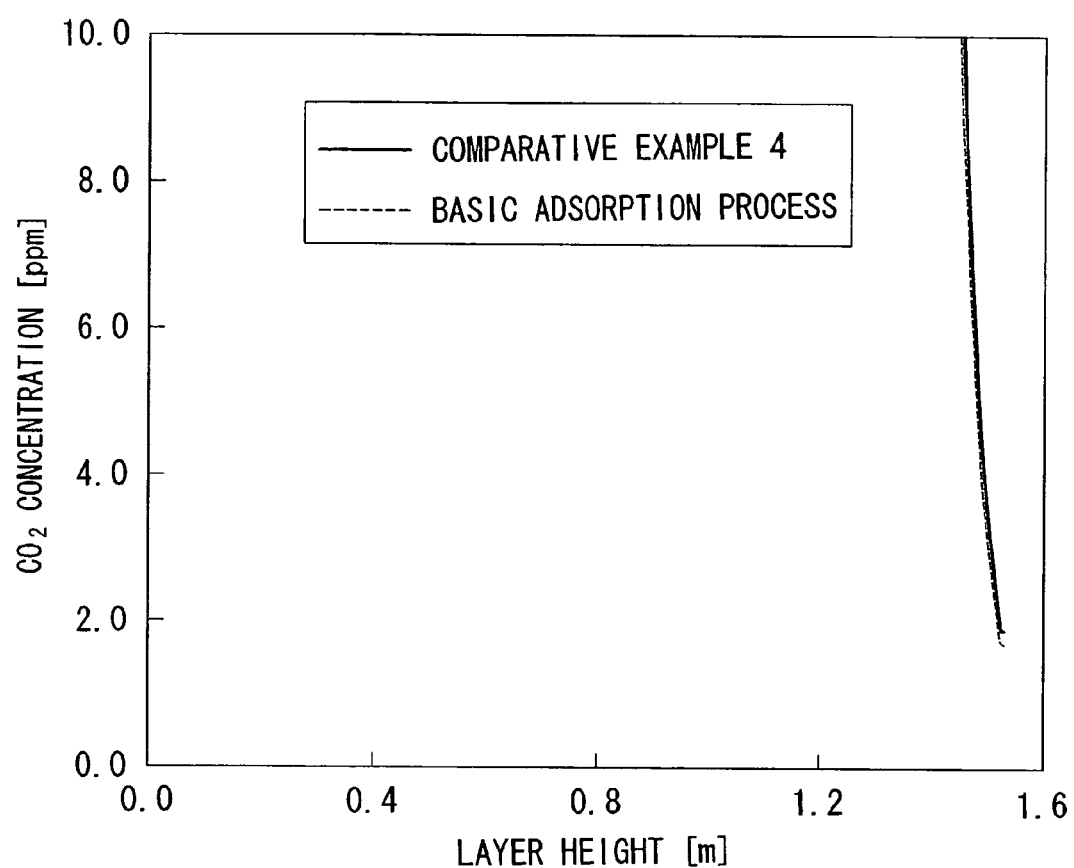
FIG. 11 is a graph representing, in Comparative example 4, the distribution of the carbon dioxide concentration in the adsorption column 5a at the time point of finishing the adsorption process which was performed when the steady operation is started.

FIG. 11 is a graph representing the distribution of the carbon dioxide concentration in the adsorption column 5a at the time point of finishing the first adsorption process after starting the steady operation. At the outflowing part of the purified air (layer height: 1.53 m), the carbon dioxide concentration in the basic adsorption process was about 1.7 ppm, and the carbon dioxide concentration in the adsorption column 5a with the aforementioned conditions was about 1.9 ppm. These results showed that the carbon dioxide concentration in the purified air flowing out from the adsorption column 5a after the restart was higher than during the steady operation.

Even though the elapsed time $t_1$ of the regeneration process is within the time range obtained by the formula (1), the carbon dioxide concentration in the purified air is unfavorably increased from during the steady operation when the TSA apparatus is restarted beyond the restart method of the second aspect of the present invention, Comparative Example 5

Under the numerical conditions of Example 5, it is before 207.6 min that the restart method of the second aspect of the present invention was applicable. In Comparative example 5, the carbon dioxide concentrations at the outflowing parts of the purified air in the adsorption columns 5a, 5b were calculated in the case where the TSA apparatus was stopped in 207.6 min or later and then was restarted in the second aspect of the present invention. The numerical conditions in this simulation were the same as in Example 4.

In this simulation, the TSA apparatus was assumed to be stopped in 230 min from the start of the regeneration process. Then, in the same way as Example 4, the adsorption process was assumed to be performed from the beginning in the state of the low load in the adsorption column 5b. Meanwhile, in the adsorption column 5a after the restart, the regeneration process was assumed to be performed by using, as the purge gas, the purified air flowing out from the adsorption column 5b from the beginning.

Figure 12:
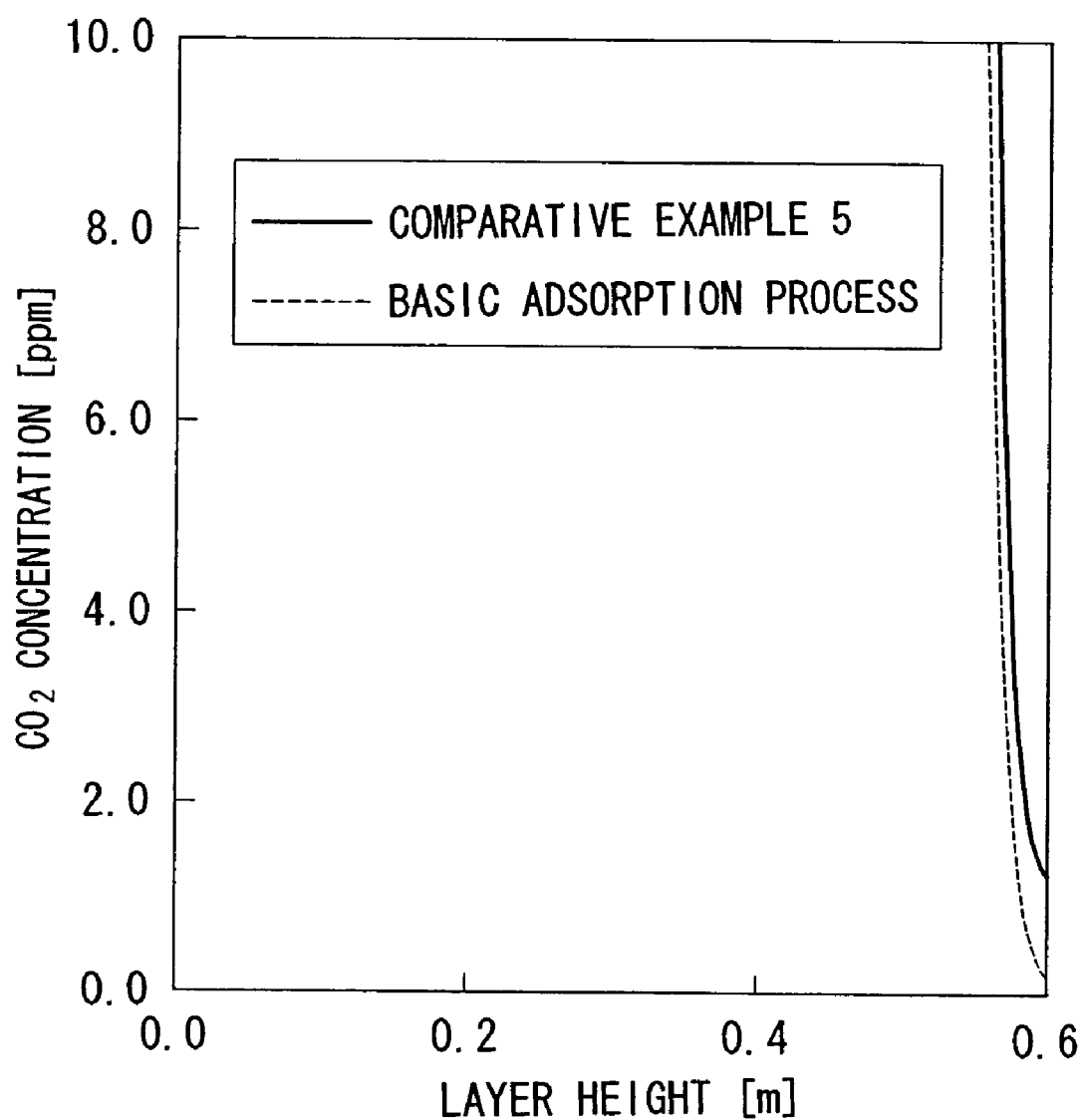
FIG. 12 is a graph representing, in Comparative example 5, the distribution of the carbon dioxide concentration in the adsorption column 5b at the time point of finishing the adsorption process which was performed during the restart.

FIG. 12 is a graph representing the distribution of the carbon dioxide concentration in the adsorption column 5b at the time point of finishing the adsorption process performed in accordance with the aforementioned conditions. At the outflowing part of the purified air (layer height: 0.60 m), the carbon dioxide concentration in the basic adsorption process was about 0.3 ppm, and the carbon dioxide concentration in the adsorption column 5b with the aforementioned conditions was about 1.2 ppm. These results showed that the carbon dioxide concentration in the purified air flowing out from the adsorption column 5b after the restart was higher than during the steady operation. Also, these results showed that the impurities were adsorbed by the adsorbent in the adsorption column 5a performing the regeneration process by using the purified air as the purge gas. Accordingly, when the elapsed time $t_1$ of the regeneration process is beyond the time range obtained by the formula (1), the self regeneration operation should be further performed several times.

Comparative Example 6

In Comparative example 5, it was found that the carbon dioxide concentration in the purified air after the restart was higher than during the steady operation when the TSA apparatus was stopped in 20 min or later after the limited value of the time range obtained by the formula (1). In Comparative example 6, the carbon dioxide concentration at the outflowing part of the purified air in the adsorption column 5b were calculated in the case where the TSA apparatus was stopped in the time point little after the limited value of the time range obtained by the formula (1) and then was restarted in the second aspect of the present invention. The numerical conditions in this simulation were the same as in Example 4.

In this simulation, the TSA apparatus was assumed to be stopped in 215 min from the start of the regeneration process. Then, in the same way as Example 4, the adsorption process was assumed to be performed from the beginning in the state of the low load in the adsorption column 5b. Meanwhile, in the adsorption column 5a after the restart, the regeneration process was assumed to be performed by using, as the purge gas, the purified air flowing out from the adsorption column 5b from the beginning.

Figure 13:
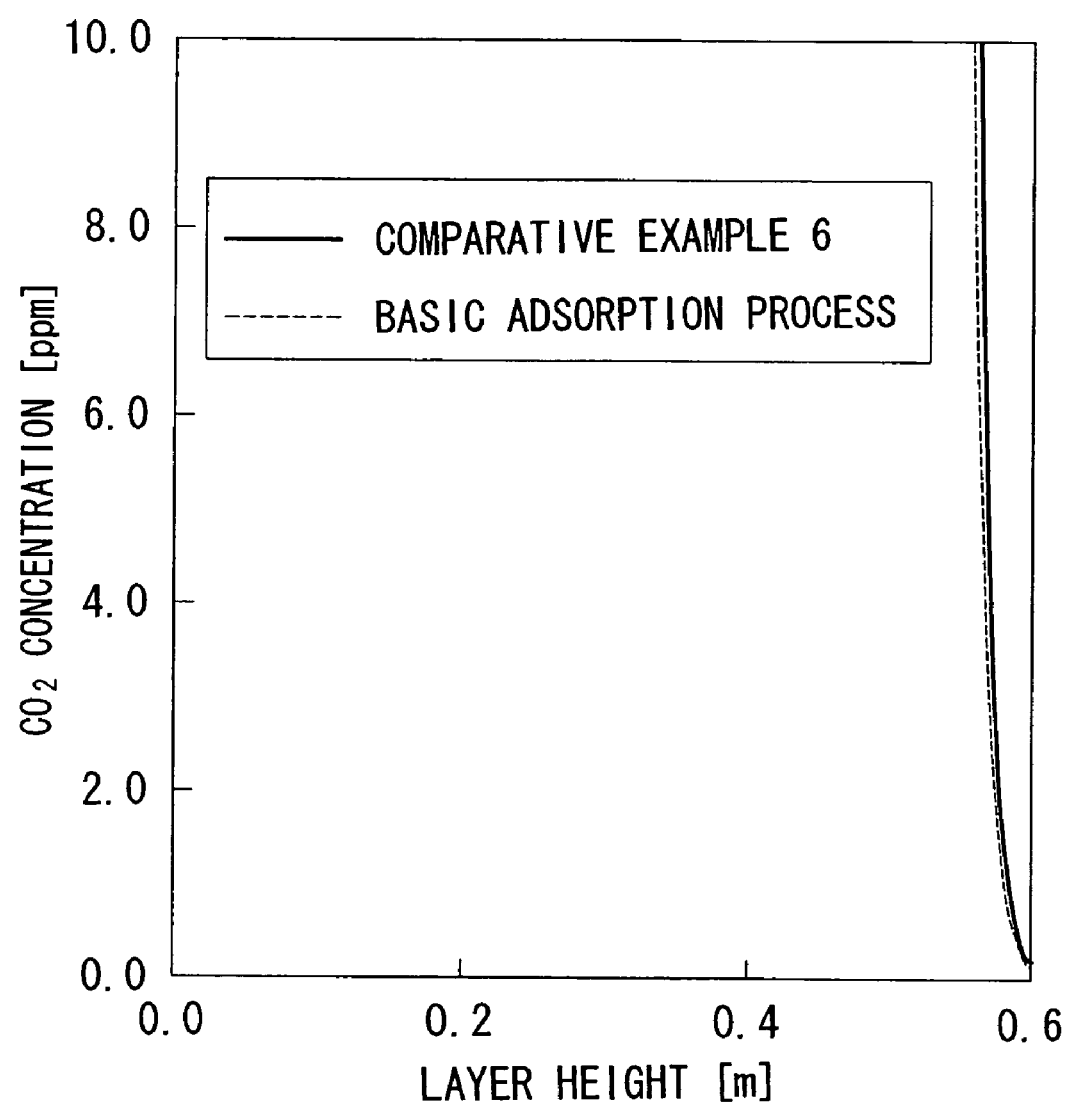
FIG. 13 is a graph representing, in Comparative example 6, the distribution of the carbon dioxide concentration in the adsorption column 5b at the time point of finishing the adsorption process which was performed during the restart.

FIG. 13 is a graph representing the distribution of the carbon dioxide concentration in the adsorption column 5b at the time point of finishing the adsorption process performed in accordance with the aforementioned conditions. At the outflowing part of the purified air (layer height: 0.60 m), the carbon dioxide concentration in the basic adsorption process was about 0.3 ppm, and the carbon dioxide concentration in the adsorption column 5b with the aforementioned conditions was about 0.4 ppm. These results showed that the carbon dioxide concentration in the purified air after the restart was reduced to one third in comparison with Comparative example 5 but higher than during the steady operation. Also, these results showed that the impurities were adsorbed by the adsorbent in the adsorption column 5a performing the regeneration process by using the purified air as the purge gas. Accordingly, when the elapsed time $t_1$ of the regeneration process is beyond the time range obtained by the formula (1), the self regeneration operation should be further performed several times.

Example 5

In Example 5, the simulation of the third aspect of the present invention was performed. The numeral conditions used in this simulation were as follows.
Moisture adsorbent: activated aluminum produced by PROCATALYSE (layer height: 0.88 m)
Carbon dioxide adsorbent: Na-X zeolite produced by W.R. Grace & Co. (layer height: 0.65 m)
Feed air pressure: 620 kPa (absolute pressure)
Feed air temperature: 40° C.
Purge gas ratio (flow rate of purge gas/flow rate of feed air): 40%
Heating gas temperature: 200° C.
Adsorption process time: 120 min
Regeneration process time: 120 min (depressurizing step: 3 min, heating step: 43 min, cooling step: 62 min, pressurizing step: 12 min)

In this simulation, the TSA apparatus was assumed to be stopped in 76 min from the start of the regeneration process in the adsorption column 5a.

After stopping the TSA apparatus, the adsorption column 5a which performed the regeneration process was assumed to be kept in the state where all the valves were closed, and the adsorption column 5b which performed the adsorption process was assumed to be depressurized and then kept in the state where all the valves were closed. In this simulation, after a lapse of 72 hours, the adsorption column 5b was assumed to be pressurized with the feed air to 620 kPa just before the restart, followed by performing the adsorption process again from the time point of stopping the TSA apparatus in the state of the low load. Meanwhile, in the adsorption column 5a after the restart, the regeneration process was assumed to be performed again by using, as the purge gas, the purified air flowing out from the adsorption column 5b.

Figure 14:
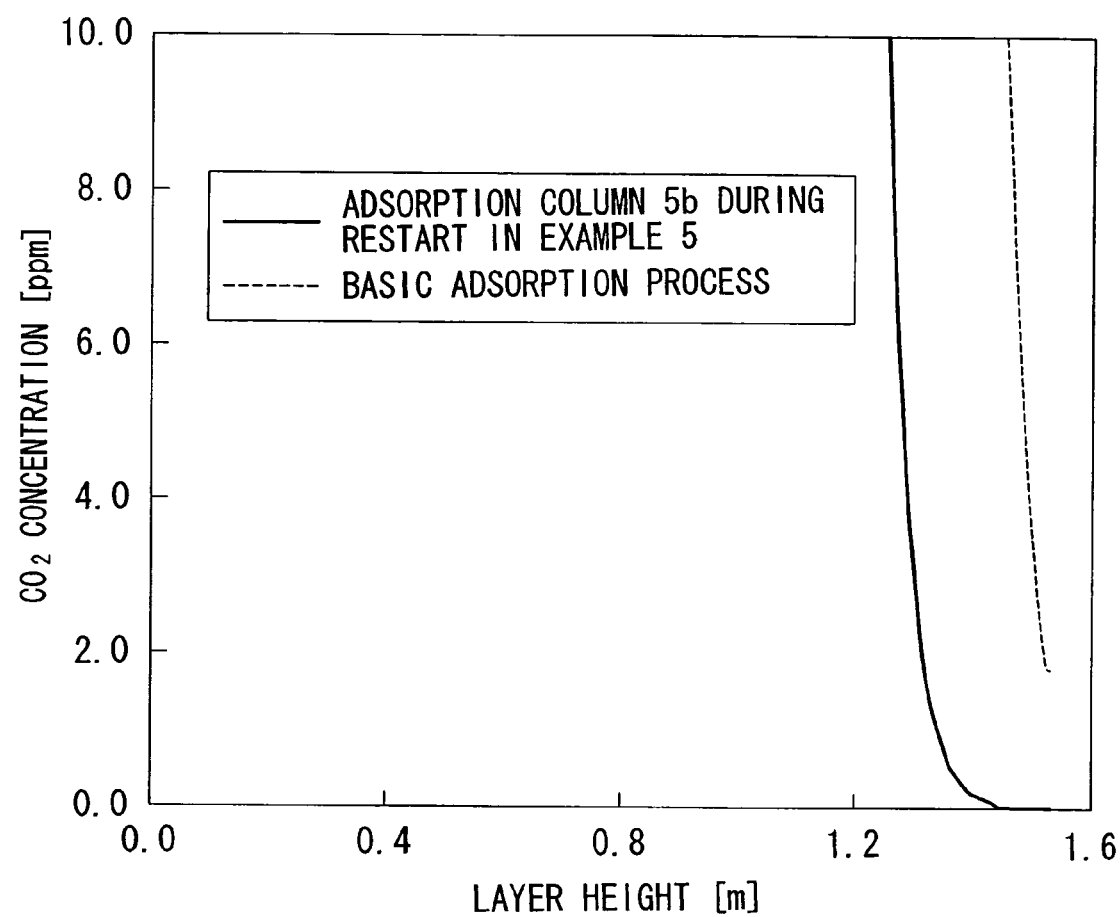
FIG. 14 is a graph representing, in Example 5, the distribution of the carbon dioxide concentration in the adsorption column 5b at the time point of finishing the adsorption process which was performed during the restart.

FIG. 14 is a graph representing the distribution of the carbon dioxide concentration in the adsorption column 5b at the time point of finishing the adsorption process which was performed again in accordance with the aforementioned conditions. The carbon dioxide concentration in the adsorption column 5b with the aforementioned conditions was lower than the carbon dioxide concentration in the basic adsorption process.

Figure 15:
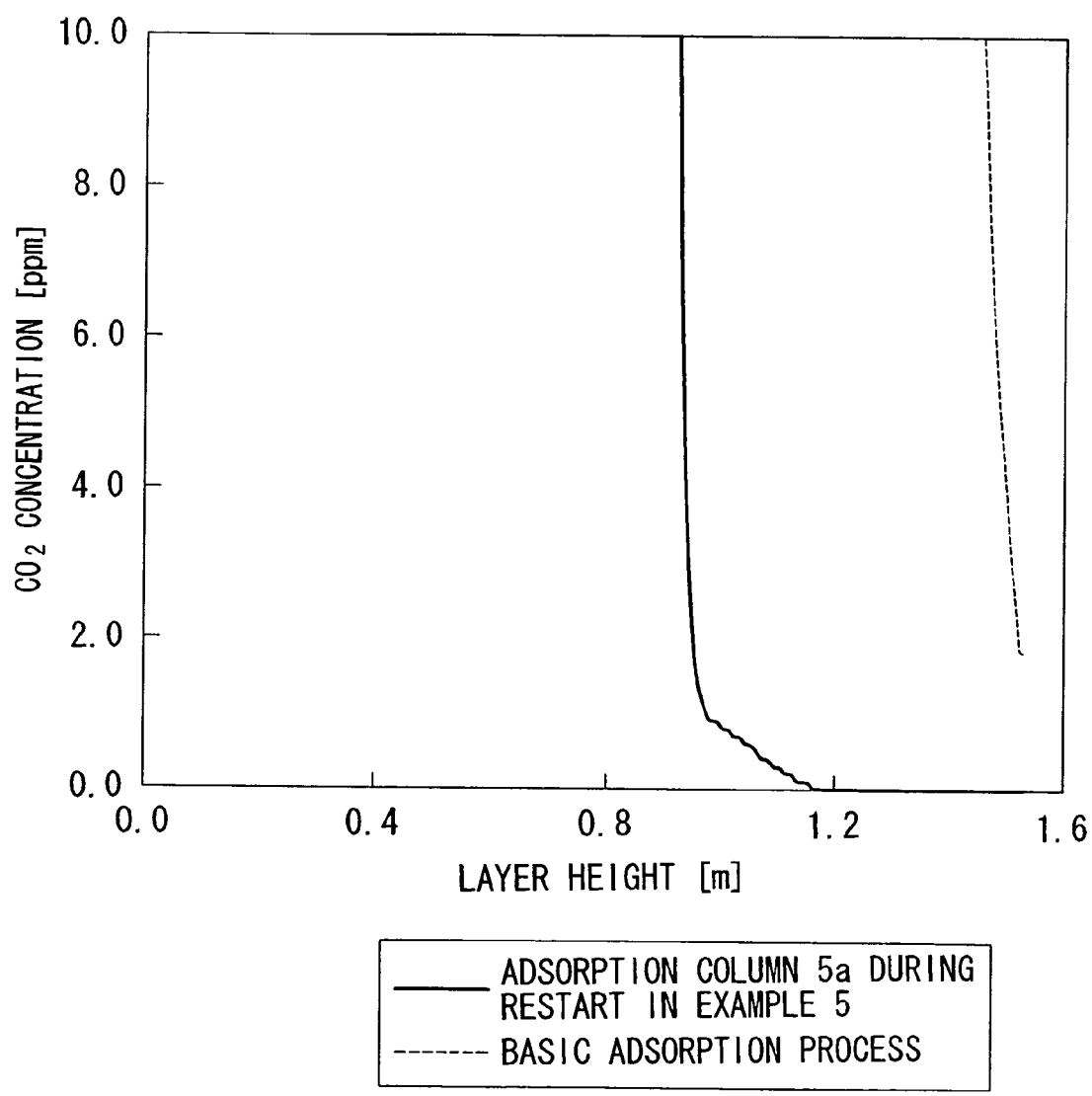
FIG. 15 is a graph representing, in Example 5, the distribution of the carbon dioxide concentration in the adsorption column 5a at the time point of finishing the adsorption process which was performed during the restart.

After the restart, the adsorption process was assumed to be performed once in the state of the low load in the adsorption column 5a finishing the aforementioned regeneration process, and the regeneration process was assumed to be performed once in the adsorption column 5b finishing the aforementioned adsorption process. FIG. 15 is a graph representing the distribution of the carbon dioxide concentration in the adsorption column 5a at the time point of finishing the adsorption process which was performed following the regeneration process. At this time, the basic adsorption process means the distribution of the carbon dioxide concentration in the adsorption column 5a at the time point of finishing the adsorption process during the steady operation. The carbon dioxide concentration in the adsorption column 5a was lower than the carbon dioxide concentration in the basic adsorption process.

Figure 16:
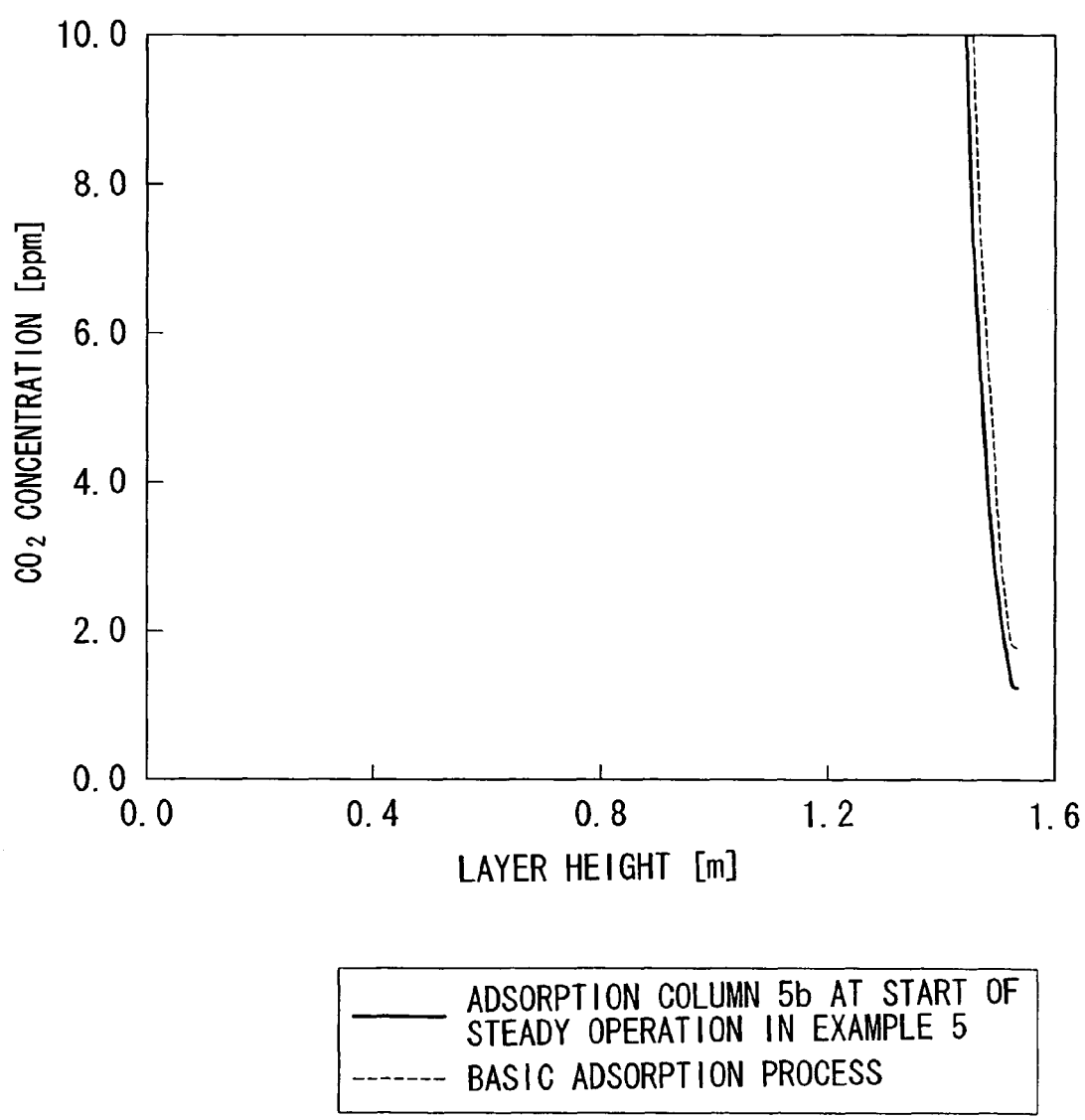
FIG. 16 is a graph representing, in Example 5, the distribution of the carbon dioxide concentration in the adsorption column 5b at the time point of finishing the adsorption process which was performed when the steady operation is started.

After finishing the aforementioned each process in the state of the low load, it was assumed that the processes were switched followed by starting the steady operation and that it was performed to feed the purified air to the air separation section 8. FIG. 16 is a graph representing the distribution of the carbon dioxide concentration in the adsorption column 5b at the time point of finishing the adsorption process at the start of feeding the purified air to the air separation section 8. The carbon dioxide concentration in the adsorption column 5b at the time point of finishing the adsorption process after feeding the purified air came closer to the basic adsorption process than the carbon dioxide concentration before feeding the purified air, but did not go beyond it.

By using the restart method of the third aspect of the present invention, it is possible to restart the TSA apparatus without increasing the carbon dioxide concentration in the purified air from during the steady operation even though the TSA apparatus was stopped for a long time of 72 hours.

Example 6

In Example 6, the carbon dioxide concentrations in the purified air in the adsorption columns 5a, 5b were calculated in the case where the TSA apparatus was stopped in 73 min from the start of the regeneration process in the adsorption column 5a in the simulation of Example 5. The calculation conditions in this simulation were the same as in Example 5.

The TSA apparatus was assumed to be stopped in 73 min from the start of the regeneration process. Then, in the same way as Example 5, the adsorption process was assumed to be performed again in the state of the low load in the adsorption column 5b. Meanwhile, in the adsorption column 5a after the restart, the regeneration process was assumed to be performed again by using the purge gas flowing out from the adsorption column 5b.

Figure 17:
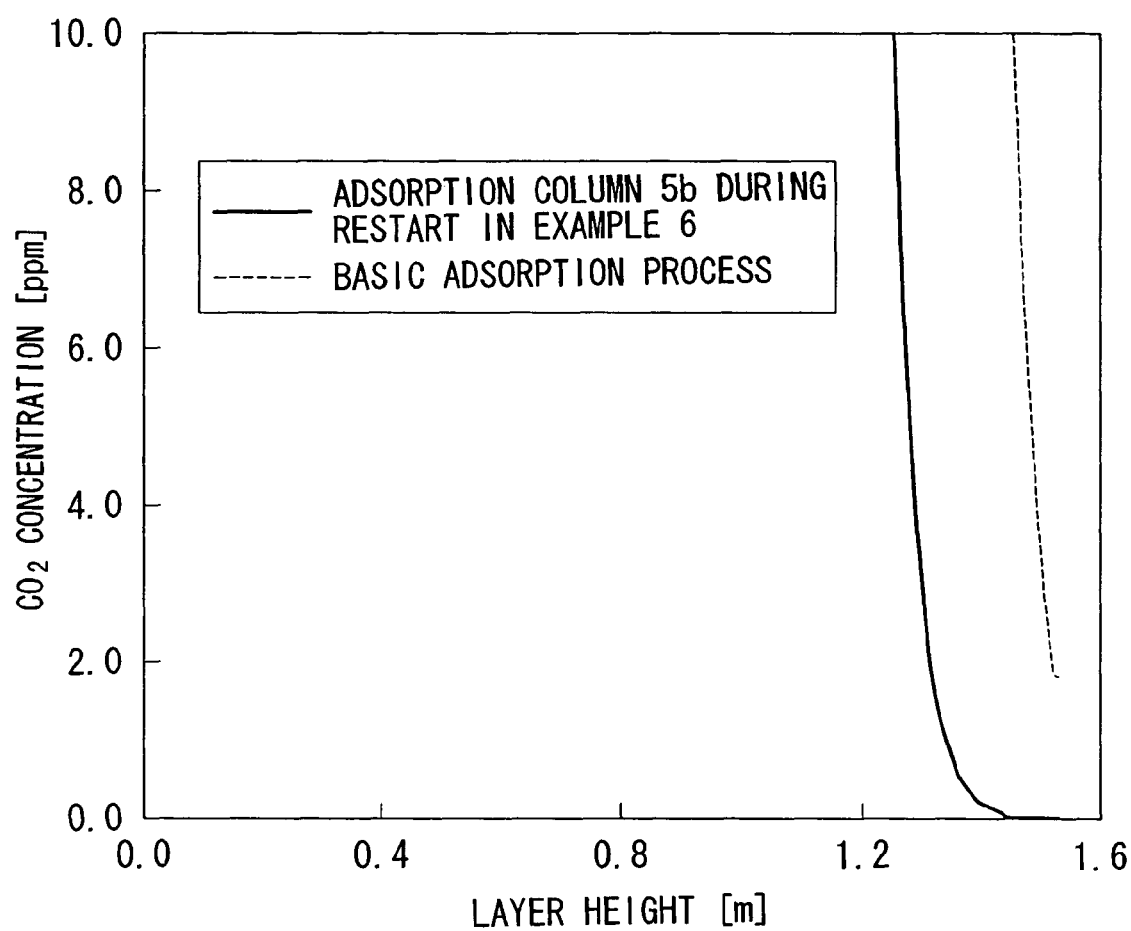
FIG. 17 is a graph representing, in Example 6, the distribution of the carbon dioxide concentration in the adsorption column 5b at the time point of finishing the adsorption process which was performed during the restart.

FIG. 17 is a graph representing the distribution of the carbon dioxide concentration in the adsorption column 5b at the time point of finishing the adsorption process which was performed again in accordance with the aforementioned conditions. The carbon dioxide concentration in the adsorption column 5b with the aforementioned conditions was lower than the carbon dioxide concentration in the basic adsorption process.

Figure 18:
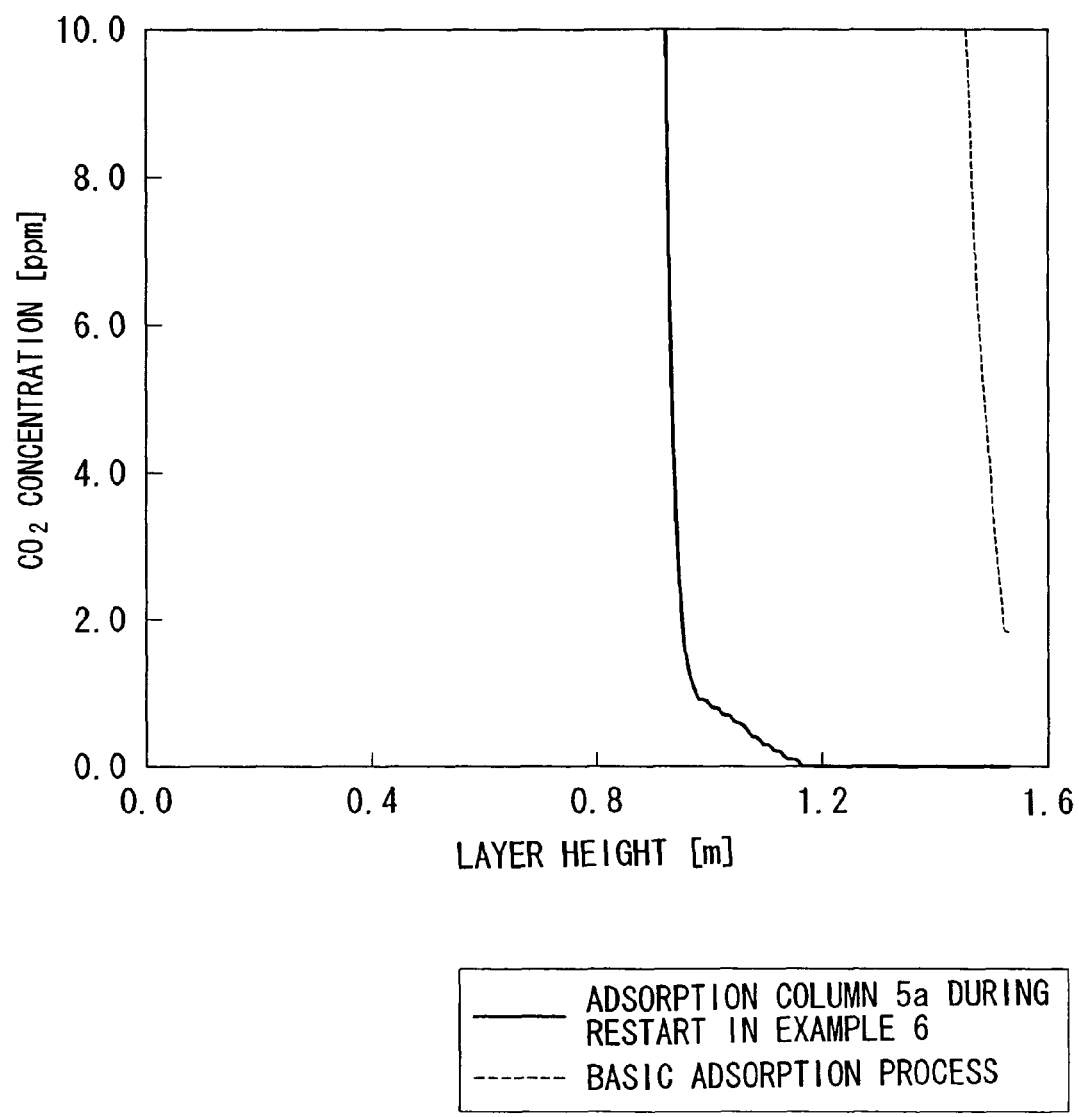
FIG. 18 is a graph representing, in Example 6, the distribution of the carbon dioxide concentration in the adsorption column 5a at the time point of finishing the adsorption process which was performed during the restart.

After the restart, the adsorption process was assumed to be performed once in the state of the low load in the adsorption column 5a finishing the aforementioned regeneration process, and the regeneration process was assumed to be performed once in the adsorption column 5b finishing the aforementioned adsorption process. FIG. 18 is a graph representing the distribution of the carbon dioxide concentration in the adsorption column 5a at the time point of finishing the adsorption process which was performed following the regeneration process. The carbon dioxide concentration in the adsorption column 5a was lower than the carbon dioxide concentration in the basic adsorption process.

Figure 19:
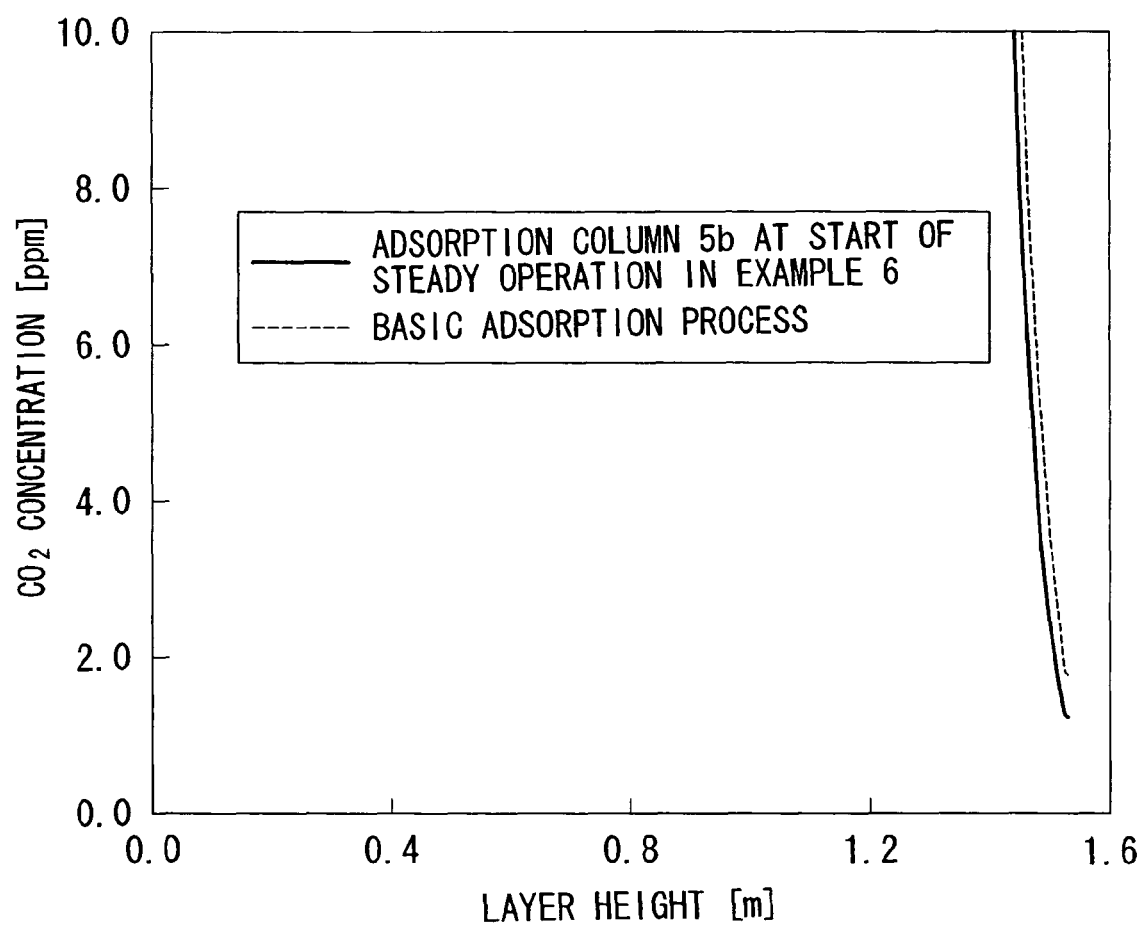
FIG. 19 is a graph representing, in Example 6, the distribution of the carbon dioxide concentration in the adsorption column 5b at the time point of finishing the adsorption process which was performed when the steady operation is started.

After finishing the aforementioned each process in the state of the low load, the steady operation was assumed to be started and it was assumed to be performed to feed the purified air to the air separation section 8. FIG. 19 is a graph representing the distribution of the carbon dioxide concentration in the adsorption column 5b at the time point of finishing the adsorption process at the start of feeding the purified air to the air separation section 8. The carbon dioxide concentration in the adsorption column 5b at the time point of finishing the adsorption process after feeding the purified air came closer to the basic adsorption process than the carbon dioxide concentration before feeding the purified air, but did not go beyond it.

Example 7

In Example 7, the carbon dioxide concentrations in the purified air in the adsorption columns 5a, 5b were calculated in the case where the TSA apparatus was stopped in 30 min from the start of the regeneration process in the adsorption column 5a in the simulation of Example 5. The numerical conditions in this simulation were the same as in Example 5.

The TSA apparatus was assumed to be stopped in 30 min from the start of the regeneration process. Then, in the same way as Example 5, the adsorption process was assumed to be performed again in the state of the low load in the adsorption column 5b. Meanwhile, in the adsorption column 5a after the restart, the regeneration process was assumed to be performed again by using the purge gas flowing out from the adsorption column 5b at the time point of stopping the TSA apparatus.

Figure 20:
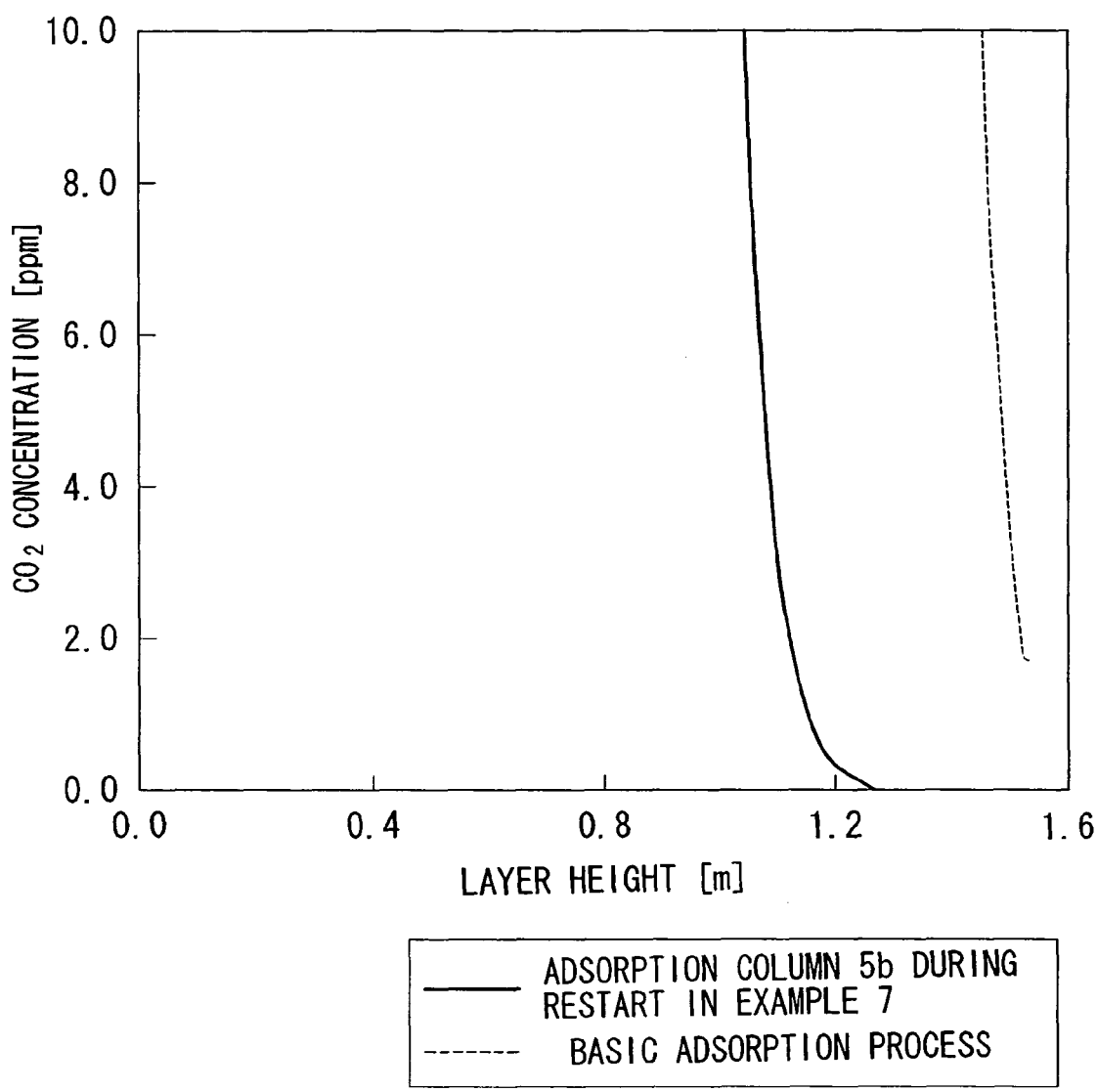
FIG. 20 is a graph representing, in Example 7, the distribution of the carbon dioxide concentration in the adsorption column 5b at the time point of finishing the adsorption process which was performed during the restart.

FIG. 20 is a graph representing the distribution of the carbon dioxide concentration in the adsorption column 5b at the time point of finishing the adsorption process which was performed again in accordance with the aforementioned conditions. The carbon dioxide concentration in the adsorption column 5b with the aforementioned conditions was lower than the carbon dioxide concentration in the basic adsorption process.

Figure 21:
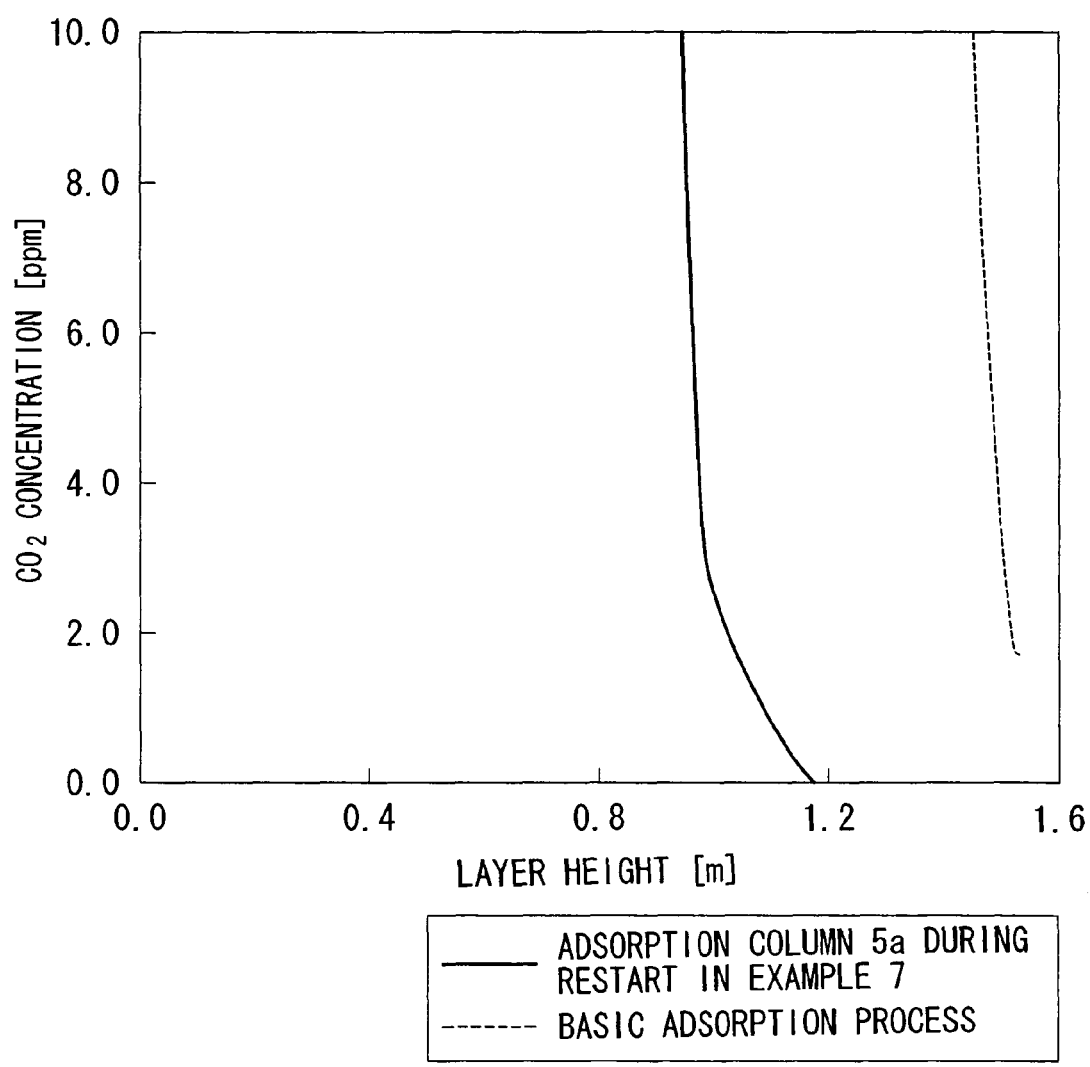
FIG. 21 is a graph representing, in Example 7, the distribution of the carbon dioxide concentration in the adsorption column 5a at the time point of finishing the adsorption process which was performed during the restart.

After the restart, the adsorption process was assumed to be performed once in the state of the low load in the adsorption column 5a finishing the aforementioned regeneration process, and the regeneration process was assumed to be performed once in the adsorption column 5b finishing the aforementioned adsorption process. FIG. 21 is a graph representing the distribution of the carbon dioxide concentration in the adsorption column 5a at the time point of finishing the adsorption process which was performed following the regeneration process. The carbon dioxide concentration in the adsorption column 5a was lower than the carbon dioxide concentration in the basic adsorption process.

Figure 22:
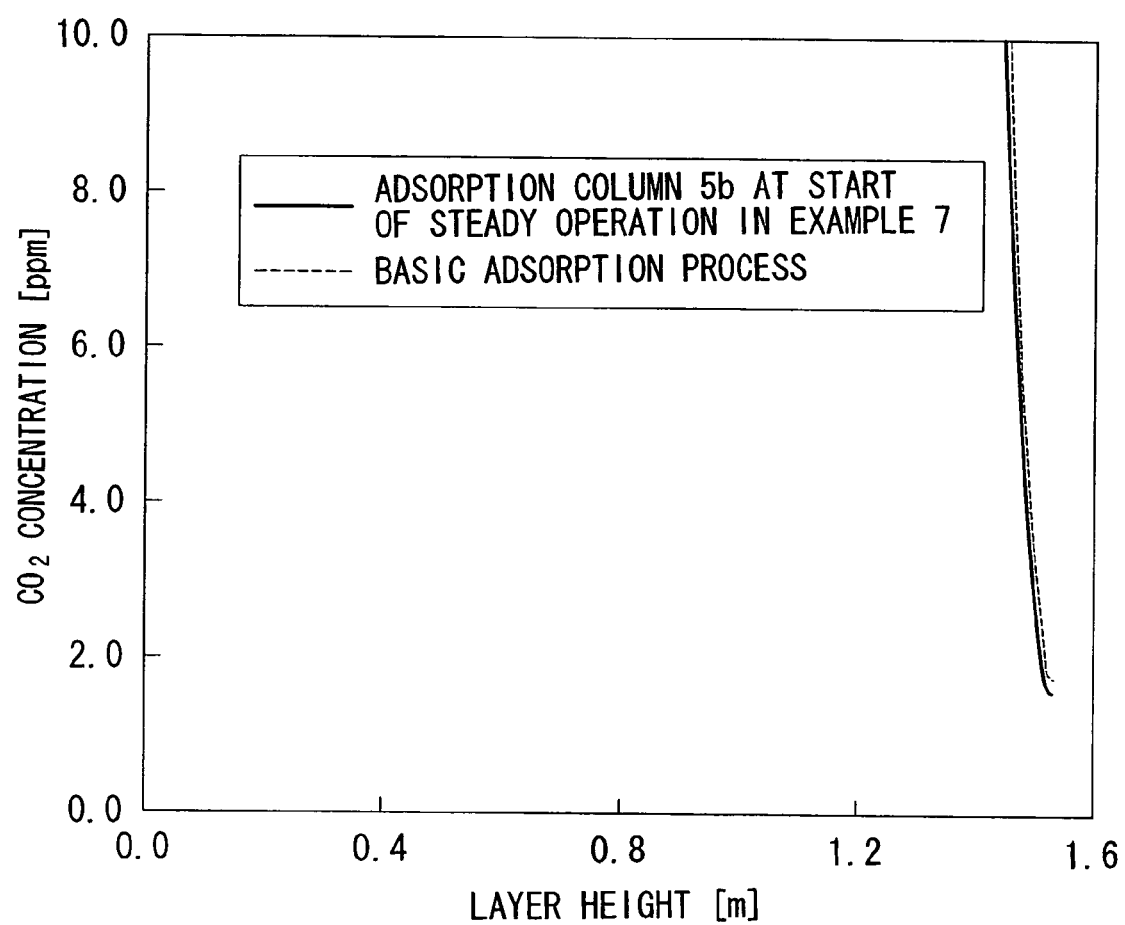
FIG. 22 is a graph representing, in Example 7, the distribution of the carbon dioxide concentration in the adsorption column 5b at the time point of finishing the adsorption process which was performed when the steady operation is started.

After finishing the aforementioned each process in the state of the low load, the steady operation was assumed to be started and it was assumed to be performed to feed the purified air to the air separation section 8. FIG. 22 is a graph representing the distribution of the carbon dioxide concentration in the adsorption column 5b at the time point of finishing the adsorption process at the start of feeding the purified air to the air separation section 8. The carbon dioxide concentration in the adsorption column 5b at the time point of finishing the adsorption process after feeding the purified air came closer to the basic adsorption process than the carbon dioxide concentration before feeding the purified air, but did not go beyond it.

By using the restart method of the third aspect of the present invention, it is possible to restart the TSA apparatus without increasing the carbon dioxide concentration in the purified air from during the steady operation. It was confirmed by the simulation that the carbon dioxide concentration did not be increased from during the steady operation even when the TSA apparatus was stopped at any time point.

Comparative Example 7

In Comparative example 7, the carbon dioxide concentrations in the purified air in the adsorption columns 5a, 5b were calculated in the case where, after stopping the TSA apparatus, the TSA apparatus was kept without depressurizing the adsorption column 5b which had performed the adsorption process in the third aspect of the present invention. The numerical conditions in this simulation were the same as in Example 5.

In this simulation, the TSA apparatus was assumed to be stopped in 76 min from the start of the regeneration process. Then, the adsorption column 5a which performed the regeneration process was assumed to be kept in the state where all valves were closed, and the adsorption column 5b which performed the adsorption process was assumed to be not depressurized and to be kept in the state where all valves were closed. In this simulation, since the adsorption column 5b possessed the adsorption process pressure, after a lapse of 72 hours, the adsorption column 5b was assumed to be not pressurized, and the adsorption process was assumed to be performed again in the state of the low load from the time point of stopping the TSA apparatus. Meanwhile, in the adsorption column 5a after the restart, the regeneration process was assumed to be performed again by using the purge gas flowing out from the adsorption column 5b from the time point of stopping the TSA apparatus.

Figure 23:
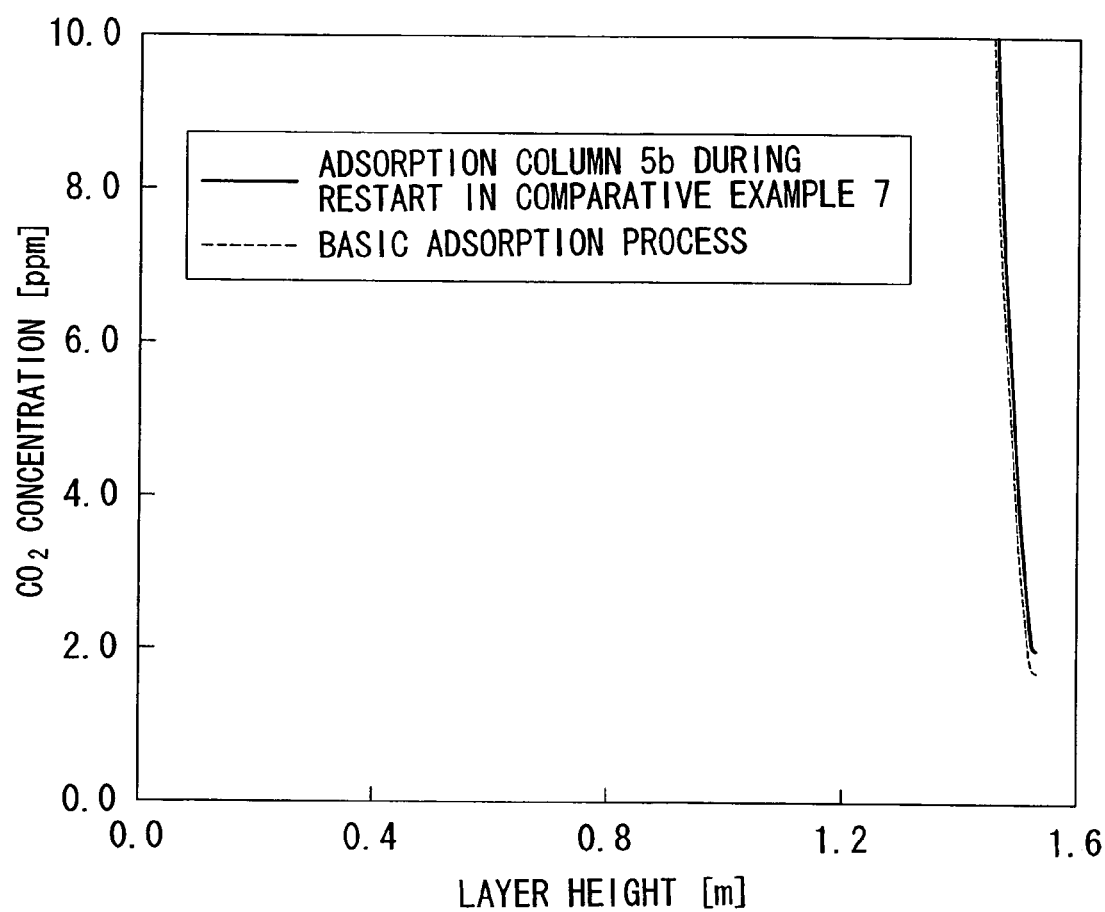
FIG. 23 is a graph representing, in Comparative example 7, the distribution of the carbon dioxide concentration in the adsorption column 5b at the time point of finishing the adsorption process which was performed during the restart.

FIG. 23 is a graph representing the distribution of the carbon dioxide concentration in the adsorption column 5b at the time point of finishing the adsorption process which was performed again in accordance with the aforementioned conditions. The carbon dioxide concentration in the adsorption column 5b with the aforementioned conditions was higher than the carbon dioxide concentration in the basic adsorption process.

Figure 24:
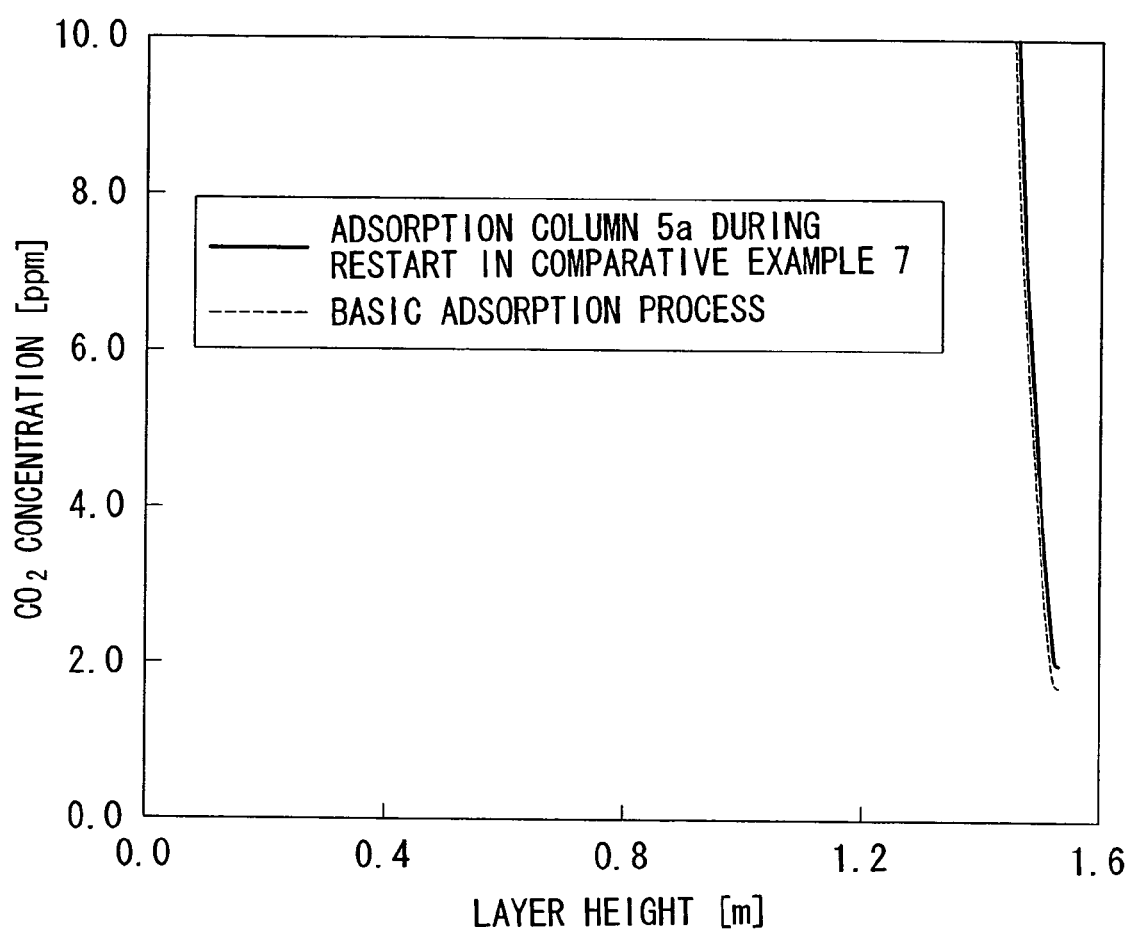
FIG. 24 is a graph representing, in Comparative example 7, the distribution of the carbon dioxide concentration in the adsorption column 5a at the time point of finishing the adsorption process which was performed during the restart.

After the restart, the adsorption process was assumed to be performed once in the state of the low load in the adsorption column 5a finishing the aforementioned regeneration process, and the regeneration process was assumed to be performed once in the adsorption column 5b finishing the aforementioned adsorption process. FIG. 24 is a graph representing the distribution of the carbon dioxide concentration in the adsorption column 5a at the time point of finishing the adsorption process which was performed following the regeneration process. The carbon dioxide concentration in the adsorption column 5a was higher than the carbon dioxide concentration in the basic adsorption process.

When the TSA apparatus is operated beyond the restart method of the third aspect of the present invention, the adsorption columns 5a, 5b are not completely regenerated even in the operation of the low load. Also, the carbon dioxide concentration in the purified air is increased from during the steady operation when the steady operation is started and it is performed to feed the purified air to the air separation section 8.

Comparative Example 8

In Comparative example 8, the carbon dioxide concentrations in the purified air in the adsorption columns 5a, 5b were calculated in the case where, after the restart of the TSA apparatus in the third aspect of the present invention, the adsorption process or the regeneration process was not performed once in the state of the low load before it is performed to feed the purified air to the air separation section 8. The numerical conditions in this simulation were the same as in Example 5.

In this simulation, the TSA apparatus was assumed to be stopped in 73 min from the start of the regeneration process. Then, in the same way as Example 5, the adsorption process was assumed to be performed again in the state of the low load in the adsorption column 5b. Meanwhile, in the adsorption column 5a after the restart, the regeneration process was assumed to be performed again by using the purge gas flowing out from the adsorption column 5b at the time point of stopping the TSA apparatus. After finishing the each process, the steady operation was assumed to be started and it was assumed to be performed to feed the purified air to the air separation section 8.

Figure 25:
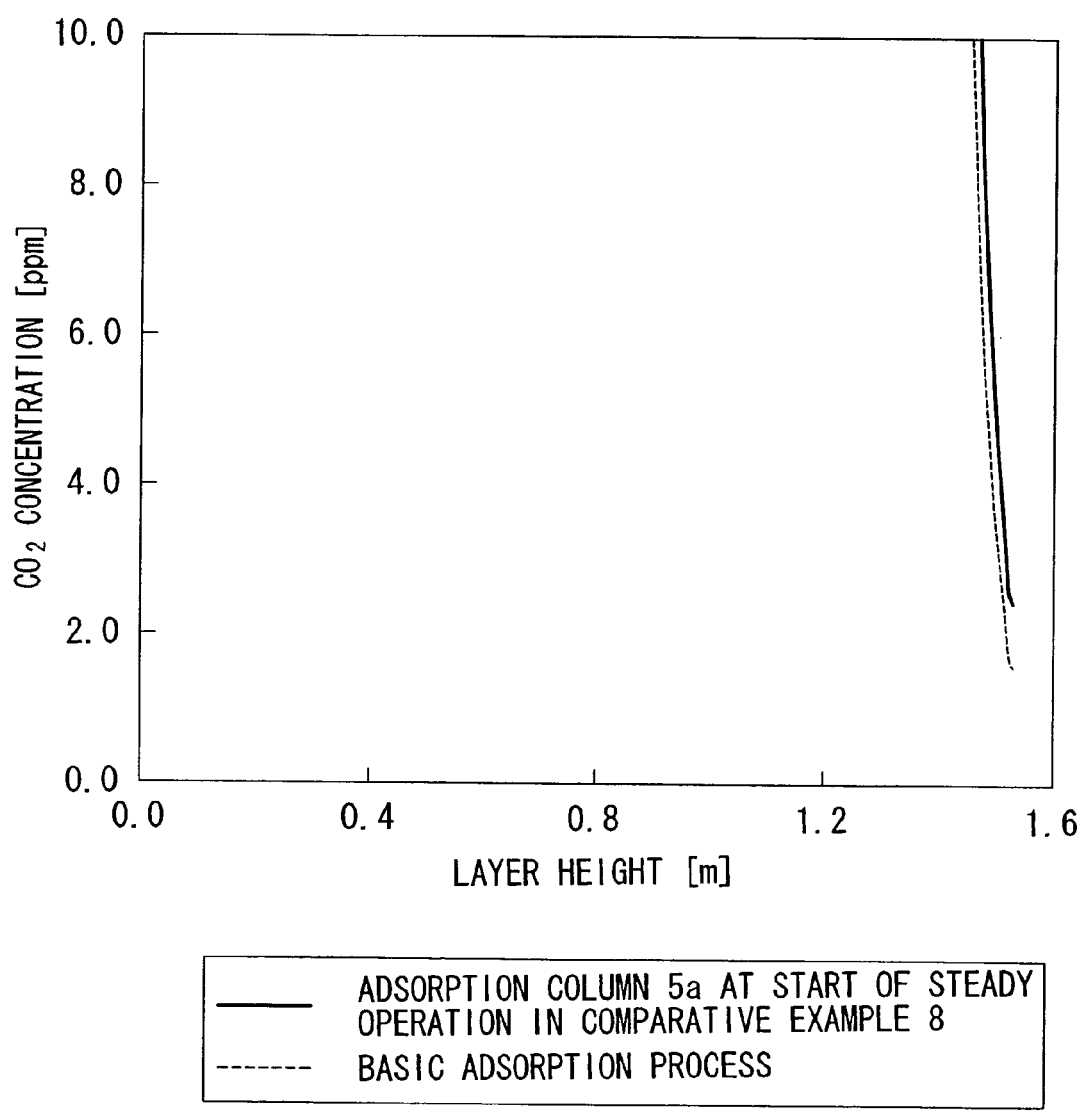
FIG. 25 is a graph representing, in Comparative example 8, the distribution of the carbon dioxide concentration in the adsorption column 5a at the time point of finishing the adsorption process which was performed when the steady operation is started.

FIG. 25 is a graph representing the distribution of the carbon dioxide concentration in the adsorption column 5a at the time point of finishing the adsorption process which was performed in accordance with the aforementioned conditions. The carbon dioxide concentration in the adsorption column 5a with the aforementioned conditions was higher than the carbon dioxide concentration in the basic adsorption process. When the TSA apparatus is operated beyond the restart method of the third aspect of the present invention, the impurity concentration in the purified air is increased from during the steady operation.

INDUSTRIAL APPLICABILITY

As described above, according to the present invention, it is possible to reduce the time after the restart before starting to feed the purified air to the cryogenic air separation plant since the self regeneration operation is not necessary even after a long stop of the TSA apparatus. Therefore, the present invention is industrially useful.

The invention claimed is:

1. A method of restarting a temperature swing adsorption (TSA) apparatus which purifies feed air for a cryogenic air separation plant, comprising:
    providing a regeneration process including measuring a temperature of a purge gas which flows out from a first adsorption column to determine when a purge gas temperature reaches a peak temperature in the regeneration process,
    stopping the TSA apparatus when the purge gas temperature reaches the peak temperature;
    sealing by closing, at the time of stopping the TSA apparatus, an entrance valve, an exit valve, and an atmosphere-releasing valve in the first adsorption column during the regeneration process;
    sealing by closing an entrance valve and an exit valve and opening an atmosphere-releasing valve in a second adsorption column during an adsorption process, so as to release a gas in the opposite direction to feed air flow, followed by closing the atmosphere-releasing valve;
    pressurizing, just before a restart, the second adsorption column with the feed air to a pressure necessary for the adsorption process;
    restarting the TSA apparatus; and
    performing, after the restart, the regeneration process in the first adsorption column and the adsorption process in the second adsorption column continuously from the time point of stopping the TSA apparatus, wherein
    the stop of the TSA apparatus includes an urgent stop and a planned stop.

2. A method of restarting a TSA apparatus according to claim 1, wherein the feed air which is fed to the TSA apparatus has a temperature of 5° C. to 45° C. and a pressure of 400 to 1,000 kPa (absolute pressure).

3. A method of restarting a temperature swing adsorption (TSA) apparatus which purifies feed air for a cryogenic air separation plant, comprising:

providing a regeneration process in a first adsorption column including stopping the TSA apparatus when an elapsed time $t_1$ satisfies the following formula, $$t_1 < t_2 - (R_1/R_2) \times (t_2 - t_3)$$

$t_1$: the elapsed time of the regeneration process (min)
$t_2$: a time of the regeneration process (min)
$t_3$: a time of a pressurizing step (min)
$R_1$: a flow rate of a purge gas (Nm$^3$/hour)
$R_2$: a flow rate of the feed air (Nm$^3$/hour)

sealing by closing, at the time of stopping the TSA apparatus, an entrance valve, an exit valve, and an atmosphere-releasing valve in the first adsorption column during the regeneration process;

sealing by closing an entrance valve and an exit valve and opening an atmosphere-releasing valve in a second adsorption column during an adsorption process, so as to release a gas in the opposite direction to feed air flow, followed by closing the atmosphere-releasing valve;

pressurizing, just before a restart, the second adsorption column with the feed air to a pressure necessary for the adsorption process;

restarting the TSA apparatus;

performing, after the restart, the regeneration process in the first adsorption column and the adsorption process in the second adsorption column from the beginning of each process while blocking purified air flow from the TSA apparatus to an air separation section; and starting to feed purified air to the air separation section, wherein the stop of the TSA apparatus includes an urgent stop and a planned stop.

4. A method of restarting a TSA apparatus according to claim 3, wherein the adsorption process is performed with the flow rate of the feed air corresponding to the flow rate of the purge gas necessary for the regeneration process of the adsorption column after the restart before starting to feed the purified air to the air separation section.

5. A method of restarting a TSA apparatus according to claim 3, wherein the feed air which is fed to the TSA apparatus has a temperature of 5° C. to 45° C. and a pressure of 400 to 1,000 kPa (absolute pressure).

6. A method of restarting a temperature swing adsorption (TSA) apparatus which purifies feed air for a cryogenic air separation plant, comprising:

sealing by closing, at the time of stopping the TSA apparatus, an entrance valve, an exit valve, and an atmosphere-releasing valve in a first adsorption column during a regeneration process;

sealing by closing an entrance valve and an exit valve and opening an atmosphere-releasing valve in a second adsorption column during an adsorption process, so as to release a gas in the opposite direction to feed air flow, followed by closing the atmosphere-releasing valve;

pressurizing, just before a restart, the second adsorption column with the feed air to a pressure necessary for the adsorption process;

restarting the TSA apparatus;

performing, after the restart, the regeneration process in the first adsorption column and the adsorption process in the second adsorption column and then switching the processes to perform the adsorption process in the first adsorption column and the regeneration process in the second adsorption column once while blocking purified air flow from the TSA apparatus to an air separation section; and starting to feed purified air to the air separation section, wherein the stop of the TSA apparatus includes an urgent stop and a planned stop.

7. A method of restarting a TSA apparatus according to claim 6, wherein the adsorption process is performed with the flow rate of the feed air corresponding to the flow rate of the purge gas necessary for the regeneration process of the adsorption column after the restart before starting to feed the purified air to the air separation section.

8. A method of restarting a temperature swing adsorption (TSA) apparatus which purifies feed air for a cryogenic air separation plant, comprising:

distinguishing the time point of stopping the TSA apparatus in the following three cases i), ii), and iii):

i) a case of providing a regeneration process including measuring a temperature of a purge gas which flows out from a first adsorption column to determine when a purge gas temperature reaches a peak temperature in the regeneration process, ii) a case of providing a regeneration process in a first adsorption column including stopping the TSA apparatus when an elapsed time $t_1$ satisfies the following formula, and $$t_1 < t_2 - (R_1/R_2) \times (t_2 - t_3)$$

$t_1$: the elapsed time of the regeneration process (min)
$t_2$: a time of the regeneration process (min)
$t_3$: a time of a pressurizing step (min)
$R_1$: a flow rate of a purge gas (Nm$^3$/hour)
$R_2$: a flow rate of the feed air (Nm$^3$/hour)

iii) a case other than the cases i) and ii);

in the case i), stopping the TSA apparatus when the purge gas temperature reaches the peak temperature, sealing by closing, at the time of stopping the TSA apparatus, an entrance valve, an exit valve, and an atmosphere-releasing valve in the first adsorption column during the regeneration process, sealing by closing an entrance valve and an exit valve and opening an atmosphere-releasing valve in a second adsorption column during an adsorption process, so as to release a gas in the opposite direction to feed air flow, followed by closing the atmosphere-releasing valve, pressurizing, just before a restart, the second adsorption column with the feed air to a pressure necessary for the adsorption process, restarting the TSA apparatus, and performing, after the restart, the regeneration process in the first adsorption column and the adsorption process in the second adsorption column continuously from the time point of stopping the TSA apparatus;

in the case ii), sealing by closing, at the time of stopping the TSA apparatus, the entrance valve, the exit valve, and the atmosphere-releasing valve in the first adsorption column during the regeneration process, sealing by closing the entrance valve and the exit valve and opening the atmosphere-releasing valve in the second adsorption column during the adsorption process, so as to release the gas in the opposite direction to the feed air flow, followed by closing the atmosphere-releasing valve, pressurizing, just before the restart, the second adsorption column with the feed air to the pressure necessary for the adsorption process, restarting the TSA apparatus, performing, after the restart, the regeneration process in the first adsorption column and the adsorption process in the second adsorption column from the beginning of the each process while blocking purified air flow from the TSA apparatus to an air separation section, and starting to feed purified air to the air separation section; and in the case iii), sealing by closing, at the time of stopping the TSA apparatus, the entrance valve, the exit valve, and the atmosphere-releasing valve in the first adsorption column during the regeneration process, sealing by closing the entrance valve and the exit valve and opening the atmosphere-releasing valve in the second adsorption column during the adsorption process, so as to release the gas in the opposite direction to the feed air flow, followed by closing the atmosphere-releasing valve, pressurizing, just before the restart, the second adsorption column with the feed air to the pressure necessary for the adsorption process, restarting the TSA apparatus, performing, after the restart, the regeneration process in the first adsorption column and the adsorption process in the second adsorption column and then switching the processes to perform the adsorption process in the first adsorption column and the regeneration process in the second adsorption column once while blocking the purified air flow from the TSA apparatus to the air separation section, and starting to feed the purified air to the air separation section, wherein the stop of the TSA apparatus includes an urgent stop and a planned stop.

9. A method of restarting a TSA apparatus according to claim 8, wherein in the cases ii) and iii), the adsorption process is performed with the flow rate of the feed air corresponding to the flow rate of the purge gas necessary for the regeneration process of the adsorption column after the restart before starting to feed the purified air to the air separation section.

* * * * *